US010517456B2

(12) United States Patent
Jun et al.

(10) Patent No.: US 10,517,456 B2
(45) Date of Patent: Dec. 31, 2019

(54) MOBILE ROBOT AND METHOD OF CONTROLLING THE SAME

(71) Applicant: LG ELECTRONICS INC., Seoul (KR)

(72) Inventors: Woochan Jun, Seoul (KR); Chulmo Sung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 186 days.

(21) Appl. No.: 15/597,418

(22) Filed: May 17, 2017

(65) Prior Publication Data
US 2017/0332872 A1 Nov. 23, 2017

(30) Foreign Application Priority Data

May 17, 2016 (KR) .................. 10-2016-0060444
Aug. 29, 2016 (KR) .................. 10-2016-0110295
Oct. 27, 2016 (KR) .................. 10-2016-0141106

(51) Int. Cl.
*B25J 19/00* (2006.01)
*B25J 5/00* (2006.01)
(Continued)

(52) U.S. Cl.
CPC ............. *A47L 11/4061* (2013.01); *A47L 5/22* (2013.01); *A47L 9/0472* (2013.01); *A47L 9/0477* (2013.01); *A47L 9/0488* (2013.01); *A47L 9/2852* (2013.01); *A47L 9/2884* (2013.01); *A47L 9/30* (2013.01); *A47L 11/24* (2013.01);
(Continued)

(58) Field of Classification Search
CPC .. A47L 11/40; A47L 5/00; B60Q 1/02; G06K 9/46; B25J 13/08; B25J 19/00; B25J 9/00; B25J 5/00; G06T 3/40
See application file for complete search history.

(56) References Cited

U.S. PATENT DOCUMENTS 4,954,962 A 9/1990 Evans, Jr. et al.
6,496,754 B2 12/2002 Song et al.
(Continued)

FOREIGN PATENT DOCUMENTS

CN 103941735 7/2014
CN 203943625 11/2014
(Continued)

OTHER PUBLICATIONS

United States Office Action dated Feb. 1, 2019 issued in co-pending related U.S. Appl. No. 15/597,333.
(Continued)

*Primary Examiner* — Yuri Kan
(74) *Attorney, Agent, or Firm* — Ked & Associates, LLP

(57) ABSTRACT

A mobile robot of the present disclosure includes a first pattern emission unit configured to emit a first patterned light downward and forward from the main body on a floor of an area to be cleaned; and an image acquisition unit configured to acquire an image of first patterned light emitted by the first pattern emission unit and incident on an obstacle. A pattern is detected from the acquired image to determine an obstacle, and a cliff is detected based on at least one of a shape or a position of the pattern in the image. The mobile robot may identify a travel path that does not lead to the cliff.

20 Claims, 19 Drawing Sheets

(51) Int. Cl.

| | | |
|---|---|---|
| *A47L 11/40* | (2006.01) | |
| *A47L 5/22* | (2006.01) | |
| *A47L 11/24* | (2006.01) | |
| *G05D 1/00* | (2006.01) | |
| *G05D 1/02* | (2006.01) | |
| *A47L 9/04* | (2006.01) | |
| *A47L 9/28* | (2006.01) | |
| *A47L 9/30* | (2006.01) | |
| *G06T 7/521* | (2017.01) | |
| *G01B 11/25* | (2006.01) | |
| *G06K 9/00* | (2006.01) | |
| *G06K 9/20* | (2006.01) | |
| *G06K 9/74* | (2006.01) | |

(52) U.S. Cl.
CPC ....... *A47L 11/4005* (2013.01); *A47L 11/4011* (2013.01); *A47L 11/4044* (2013.01); *A47L 11/4066* (2013.01); *G01B 11/2513* (2013.01); *G05D 1/0088* (2013.01); *G05D 1/0238* (2013.01); *G05D 1/0248* (2013.01); *G06K 9/00691* (2013.01); *G06K 9/2036* (2013.01); *G06K 9/74* (2013.01); *G06T 7/521* (2017.01); *A47L 2201/022* (2013.01); *A47L 2201/04* (2013.01); *G05D 2201/0203* (2013.01); *G06K 9/00664* (2013.01)

(56) References Cited

U.S. PATENT DOCUMENTS

| | | | |
|---|---|---|---|
| 8,693,007 B2 | 4/2014 | Ishigaki | |
| 8,781,626 B2 * | 7/2014 | Landry | G05D 1/0272 |
| | | | 700/253 |
| 8,862,271 B2 | 10/2014 | Shamlian et al. | |
| 9,339,163 B2 | 5/2016 | Noh et al. | |
| 9,440,355 B2 | 9/2016 | Noh et al. | |
| 9,511,494 B2 | 12/2016 | Noh et al. | |
| 9,981,593 B2 * | 5/2018 | Mayer | B60Q 1/085 |
| 2005/0000543 A1 | 1/2005 | Taylor et al. | |
| 2010/0110280 A1 * | 5/2010 | Aoyama | G01S 7/023 |
| | | | 348/364 |
| 2010/0257690 A1 * | 10/2010 | Jones | A47L 5/30 |
| | | | 15/319 |
| 2011/0144805 A1 * | 6/2011 | Chiappetta | G05D 1/0272 |
| | | | 700/253 |
| 2011/0245972 A1 | 10/2011 | Yan | |
| 2014/0209122 A1 | 7/2014 | Jung et al. | |
| 2014/0304937 A1 | 10/2014 | Kim et al. | |
| 2015/0120056 A1 | 4/2015 | Noh et al. | |
| 2015/0168954 A1 | 6/2015 | Hickerson et al. | |
| 2015/0363914 A1 * | 12/2015 | Boyle | G06T 3/4038 |
| | | | 345/629 |
| 2016/0104044 A1 | 4/2016 | Noh et al. | |
| 2016/0279808 A1 * | 9/2016 | Doughty | G01D 5/34738 |
| 2017/0072558 A1 * | 3/2017 | Reynolds | G05D 1/0246 |
| 2017/0154219 A1 | 6/2017 | Shin et al. | |

FOREIGN PATENT DOCUMENTS

| | | |
|---|---|---|
| CN | 104245244 | 12/2014 |
| CN | 104586322 | 5/2015 |
| CN | 104597902 | 5/2015 |
| CN | 205031182 | 2/2016 |
| JP | 2013-104858 | 5/2013 |
| JP | 2014-048842 | 3/2014 |
| KR | 10-2013-0141979 | 12/2013 |
| KR | 10-1362373 | 2/2014 |
| KR | 10-2015-0050160 | 5/2015 |
| KR | 10-2015-0065972 | 6/2015 |
| KR | 10-2016-0043841 | 4/2016 |

OTHER PUBLICATIONS

PCT International Search Report (with English Translation) dated Sep. 4, 2017 issued in Application No. PCT/KR2017/005136.
Taiwanese Office Action dated Feb. 5, 2018 issued in Application No. 106116151.
PCT International Search Report (with English Translation) dated Feb. 26, 2018 issued in Application No. PCT/KR2017/005132.
Taiwanese Office Action dated Mar. 14, 2018 issued in Application No. 106116158.
PCT International Search Report (with English Translation) dated Feb. 20, 2018 issued in Application No. PCT/KR2017/005133.
PCT International Search Report (with English Translation) dated Feb. 26, 2018 issued in Application No. PCT/KR2017/005135.
Taiwanese Office Action dated Feb. 26, 2018 issued in Application No. 106116156.
Korean Office Action dated Mar. 20, 2018 issued in Application No. 10-2016-0141106.
Taiwanese Office Action dated Mar. 29, 2018 issued in Application No. 106116154.
U.S. Office Action issued in co-pending related U.S. Appl. No. 15/597,531 dated Oct. 5, 2018.
U.S. Office Action dated Jun. 27, 2019 issued in U.S. Appl. No. 15/597,670.

* cited by examiner (a)

(b)

(c)

(d)

(e)

(a)

(b)

(c)

(d)

(e)

(e)

MOBILE ROBOT AND METHOD OF CONTROLLING THE SAME

CROSS-REFERENCE TO RELATED APPLICATION(S)

This application claims the priority benefit of Korean Patent Application No. 10-2016-0060444, filed on May 17, 2016, Korean Patent Application No. 10-2016-0110295, filed on Aug. 29, 2016, and Korean Patent Application No. 10-2016-0141106, filed on Oct. 27, 2016 in the Korean Intellectual Property Office, the disclosures of which are incorporated herein by reference.

BACKGROUND

1. Field

The present disclosure relates to a mobile robot and a method of controlling the mobile robot to detect and bypass obstacles.

2. Background

A mobile robot (also referred to as a robot cleaner) is a home appliance that performs cleaning by sucking dust or foreign substances from a floor while travelling autonomously in an area to be cleaned. The mobile robot detects the distance to obstacles, such as furniture, office supplies, walls, and the like, in an area to be cleaned, and based on the detection, the mobile robot maps the area to be cleaned and maneuvers to bypass the obstacles by controlling a driving of a left and/or right wheel included in the mobile robot.

A distance traveled by the mobile robot from a given location may be measured by a sensor that estimates movement of the mobile robot relative to a ceiling or floor. A distance traveled by the mobile before encountering an obstacle may be calculated based on the measured travel distance. However, the measurement of the distance to an obstacle is an indirect estimate based on a moving distance of the mobile robot, and inaccuracies in measuring the moving distance results in errors in identifying the location of the obstacles. The moving distance of the mobile robot may not be measured accurately due to an uneven surface of the floor and the like. Additionally, the mobile robot may perform distance measurement by emitting infrared or ultrasound transmissions toward an object and measuring reflections, but this technique may generate errors due to based on the due to a large amount of light or sound diffused by the obstacle.

Korean Laid-open Patent Publication No. 10-2013-0141979 (hereinafter referred to as '979 disclosure) discloses a mobile robot that includes a light emitting unit emitting light in a cross pattern, and a camera unit that acquires a forward image of a cleaner. However, the mobile robot of the '979 disclosure has a drawback in that the mobile robot has one light source configured to emit light at a uniform angle, thereby limiting the range of detection of obstacles and leading to difficulty in identifying stereoscopic shapes of high obstacles.

Furthermore, when identifying and bypassing a cliff (such as stairs), the mobile robot in the '979 disclosure may not identify the cliff at in a single pass and may need to repeatedly approach the cliff to ascertain it, thereby requiring a longer time to identify the cliff.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1A:
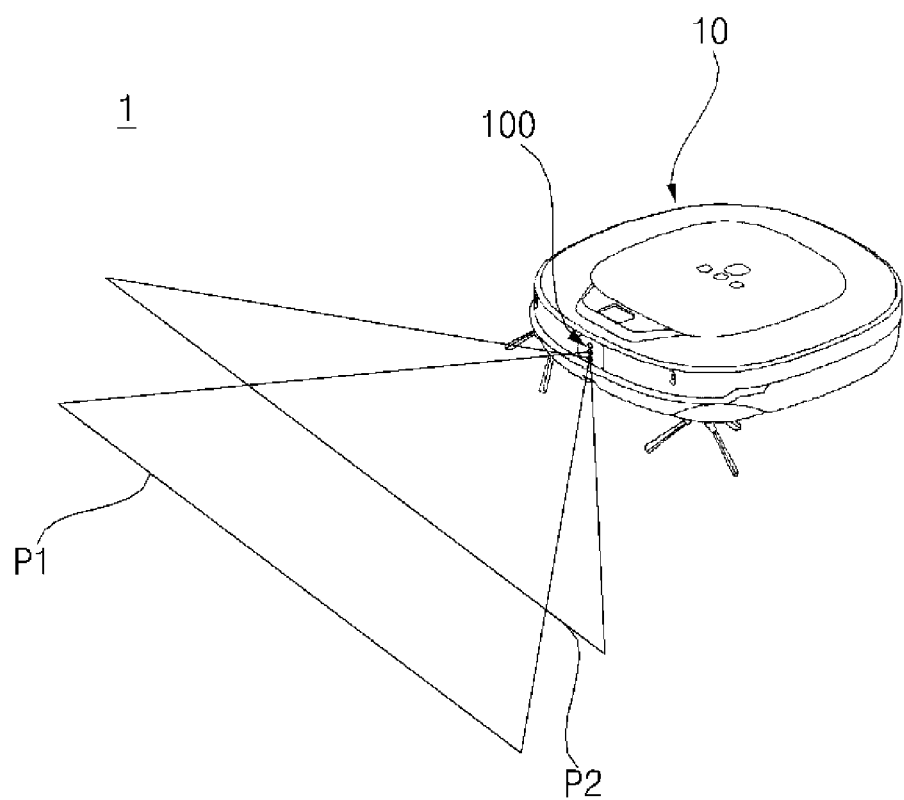
FIG. 1A is a perspective view of a mobile robot according to an exemplary embodiment of the present disclosure.

Referring to FIGS. 1 to 4, the mobile robot 1 according to an exemplary embodiment of the present disclosure includes: a main body 10, which travels over a floor of an area to be cleaned to suck dust or foreign substances from the floor; and an obstacle detection unit 100 provided on a front surface of the main body 10. The main body 10 may include a casing 11, which forms an exterior of the main body 10 and an interior space to accommodate components of the main body 10; a suction unit provided at the casing 11 to suck dust, waste, and the like; and a left wheel 36 (L) and a right wheel 36 (R) which are rotatably provided at the casing 11. As the left wheel 36 (L) and the right wheel 36 (R) rotate, the main body 10 may travel along the floor of the area to be cleaned, so that the suction unit may suck foreign materials.

The suction unit (or module) may include a cleaning roller or cleaning brush 34. The suction unit may also include a suction fan (not shown) to generate a suction force; and a suction hole 10h, through which air generated by rotation of the suction fan is suctioned. The suction unit may also include: a filter to collect foreign materials from the air suctioned through the suction hole 10h; and a foreign substance collecting container (not shown) where the foreign substances collected from the filter are stored.

Further, the main body 10 may include a travel driving unit (or drive module) 300 to drive the left wheel 36 (L) and the right wheel 36 (R). The travel driving unit 300 may include at least one driving motor. For example, the driving motor may include a left wheel driving motor, which rotates the left wheel 36 (L), and the right wheel driving motor, which rotates the right wheel 36 (R). The left wheel driving motor and the right wheel driving motor may be controlled independently from each other by a travel control unit (or controller) 230 of a controller 200, such that the main body 10 may move forward or backward, or may turn. For example, when the main body 10 moves forward, the left wheel driving motor and the right wheel driving motor may rotate in the same direction. Conversely, the left wheel driving motor and the right wheel driving motor may rotate at different speeds or rotate in opposite directions to each other to change a traveling direction of the main body 10. At least one auxiliary wheel 37 may be further included under the main body 10 to stably support the main body 10.

The main body 10 may be further include brushes 35, which are positioned at a front bottom portion of the casing 11 and have radially extending bristles or blades. As the plurality of brushes 35 rotate, dust may be removed from the floor of the area to be cleaned, and the removed dust may be suctioned through the suction hole 10h into the collecting container. The main body 10 may also include a control panel 39 provided on the top of the casing 11, and control panel 39 may receive, from a user, input of various instructions to control the mobile robot 1.

Figure 1B:
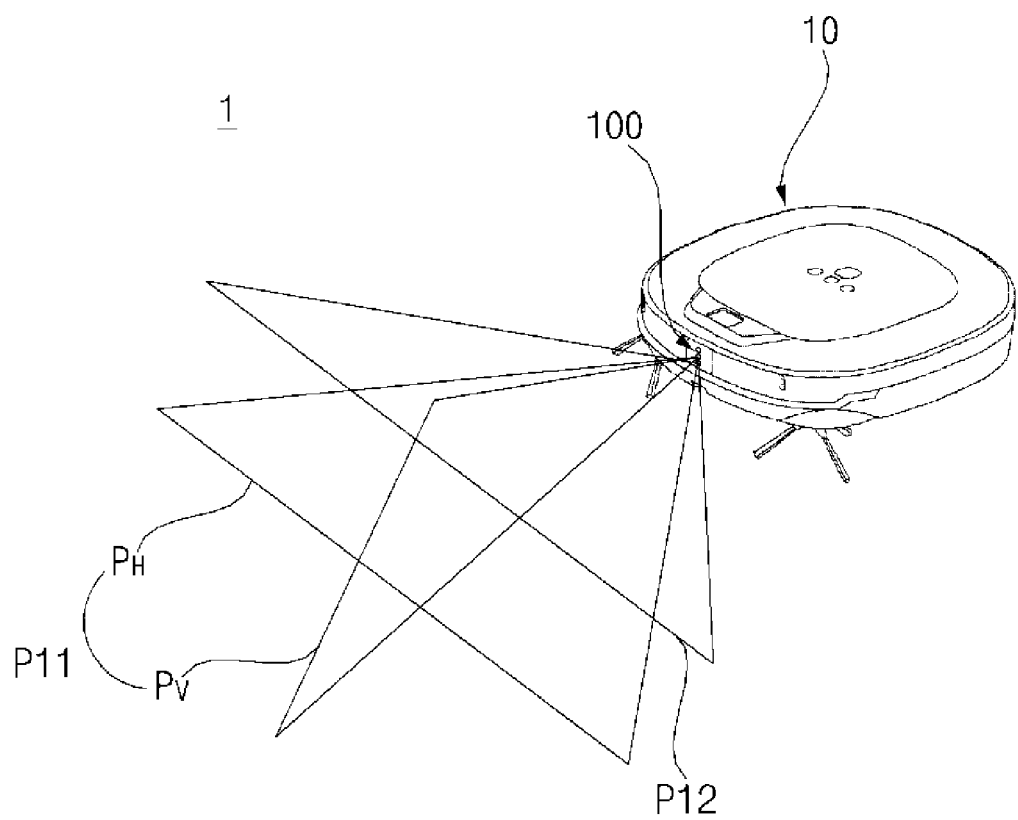
FIG. 1B is a perspective view of a mobile robot according to another exemplary embodiment of the present disclosure.
Figure 6:
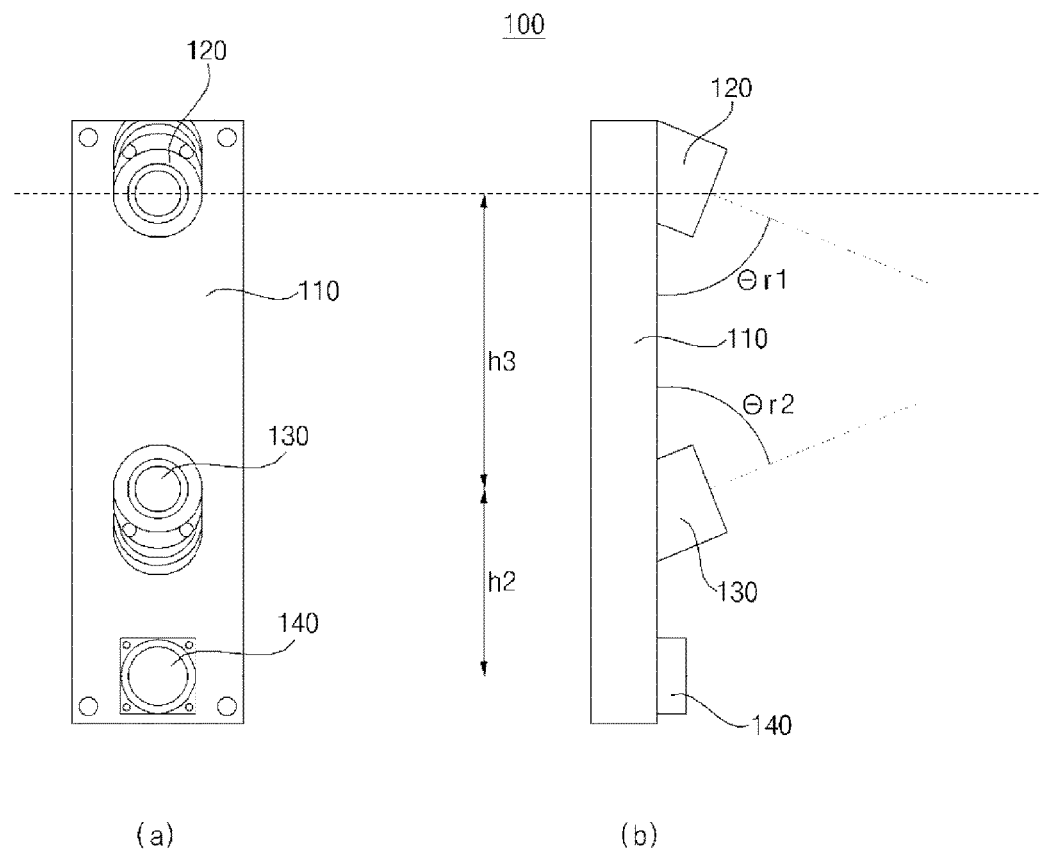
FIG. 6 is a front view and a lateral view of an obstacle detection unit according to a first exemplary embodiment of the present disclosure.

The obstacle detection unit (or module) 100 may be provided on a front surface of the main body 10. The obstacle detection unit 100 may be fixed at a front surface of the casing 11. As shown in FIG. 6, the obstacle detection unit 100 may include a first pattern emission unit (or light source) 120, a second pattern emission unit (or light source) 130, and the image acquisition unit (or camera) 140. The first pattern emission unit 120 and the second pattern emission unit 130 may emit different patterned lights, as illustrated in FIGS. 1A and 1B. The first pattern emission unit 120 and the second pattern emission unit 130 illustrated in FIGS. 1A and 1B are indicated by the same reference numerals, and the shape of the emitted pattern is not limited to the drawings.

As illustrated in FIG. 1A, the first pattern emission unit 120 may emit light in a first pattern P1 (hereinafter referred to as first patterned light) downward and forward from the main body 10. The second pattern emission unit 120 may emit light in a second pattern P2 (hereinafter referred to as second patterned light) upward and forward from the main body 10. In the example shown in FIG. 1A, the first patterned light P1 and the second patterned light P2 each are in a straight-line shape the extend in a horizontal direction.

In another example illustrated in FIG. 1B, the first pattern emission unit 120 may emit light in an alternative first patterned light P11 downward and forward from the main body 10. Accordingly, the first patterned light P11 may be emitted to the floor of an area to be cleaned. The first patterned light P11 may be in a cross shape formed by intersecting a horizontal line segment Ph and a vertical line segment Pv.

The second pattern emission unit 120 may emit light in an alternative second patterned light P12 upward and forward from the main body 10. The second patterned light P12 may have a substantially straight-line segment shape that extends in a horizontal direction parallel to the horizontal line Ph of the first patterned light P11.

Figure 3A:
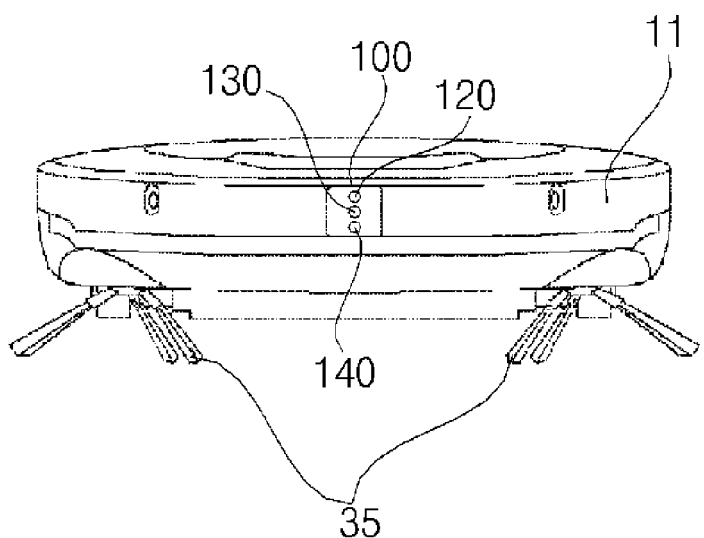
FIG. 3A is a front view of the mobile robot illustrated in FIG. 1A.

As illustrated in FIG. 3A, the obstacle detection unit 100 according to a first exemplary embodiment may position the image acquisition unit 140 below the first pattern emission unit 120 and the second pattern emission unit 130. Furthermore, the first pattern emission unit 120, the second pattern emission unit 130, and the image acquisition unit 140 may be vertically aligned.

Figure 3B:
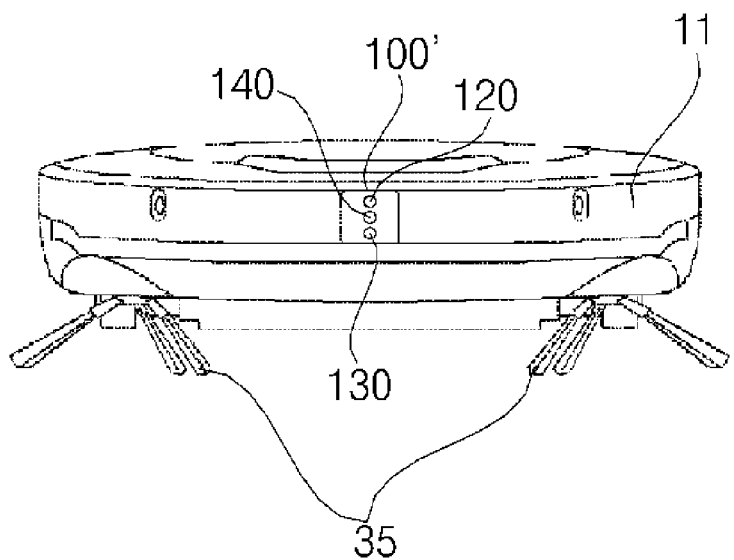
FIG. 3B is a front view of the mobile robot illustrated in FIG. 1B.

In another example illustrated in FIG. 3B, the obstacle detection unit 100' according to a second exemplary embodiment may vertically align the first pattern emission unit 120, the second pattern emission unit 130, and the image acquisition unit 140 and may be positions the image acquisition unit 140 between the first pattern emission unit 120 and the second pattern emission unit 130. For example, the image acquisition unit 140 may be provided at the center of the first pattern emission unit 120 and the second pattern emission unit 130 such that a distance from the image acquisition unit 140 to the first pattern emission unit 120 may be correspond a distance between the image acquisition unit 140 to the second pattern emission unit 130. In the obstacle detection unit 100 according to the first and second exemplary embodiments, the shaped light patterns emitted by the first pattern emission unit 120 and the second pattern emission unit 130 may have any shape, such as the straight-line first patterned light P1 illustrated in FIG. 1A or the cross shape first patterned light P11 illustrated in FIG. 1B.

In other examples, one or more components of the obstacle-sensing unit 100 may be provided on a different surface of the main body 10, such as on a top, side, or bottom surface. Additionally, it should be appreciated that although the first pattern emission unit 120 and the second pattern emission unit 130 are described herein as separate components, they may be included in a single unit (not shown) that transmits both the first and second patterns of light. For example, a single emission unit 120 may include a lens, splitter, mirror, or other element that divides an output to form the first and second patterns of light. In yet another example, a single pattern emission unit 120 may alternatively output the first and second patterns of light.

Figure 4:
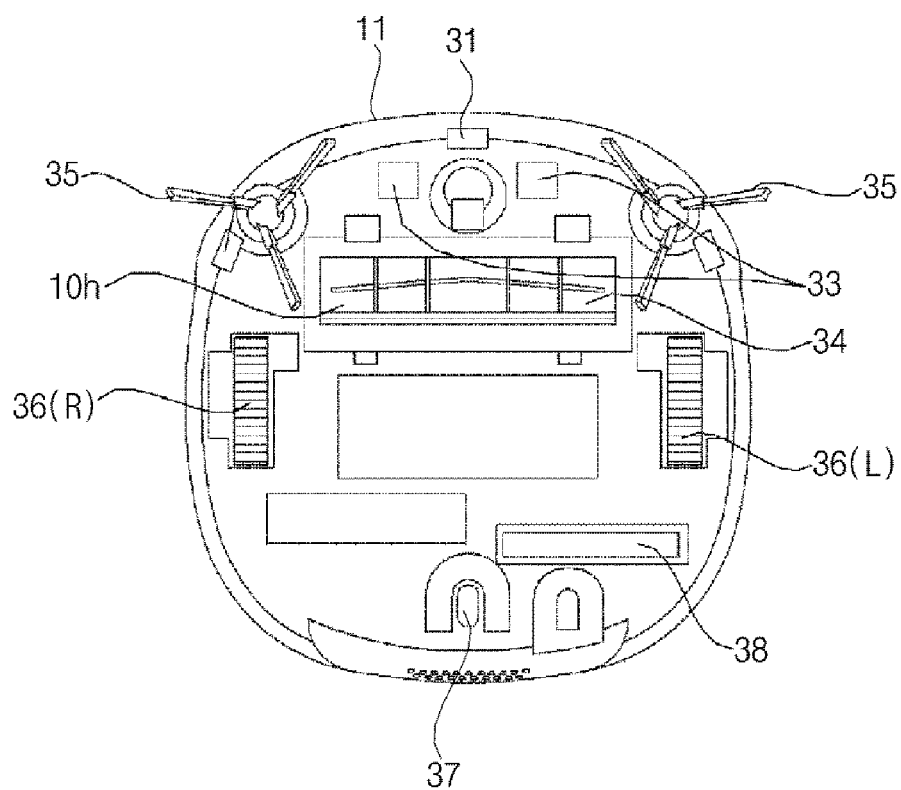
FIG. 4 is a bottom view of the mobile robot illustrated in FIG. 1.

Referring to FIG. 4, the main body 10 may further be equipped with a rechargeable battery 38, which is charged by connecting a charging terminal 33 to a commercial power source (for example, power outlet at home), or by docking the main body 10 at a charging station connected to the commercial power source such that the charging terminal may be electrically connected to the commercial power source. Electronic parts included in the mobile robot 1 may be supplied with power from the battery 38. Thus, upon charging the battery 38, the mobile robot 1 may travel autonomously after electrically separating from the commercial power source.

Figure 5:
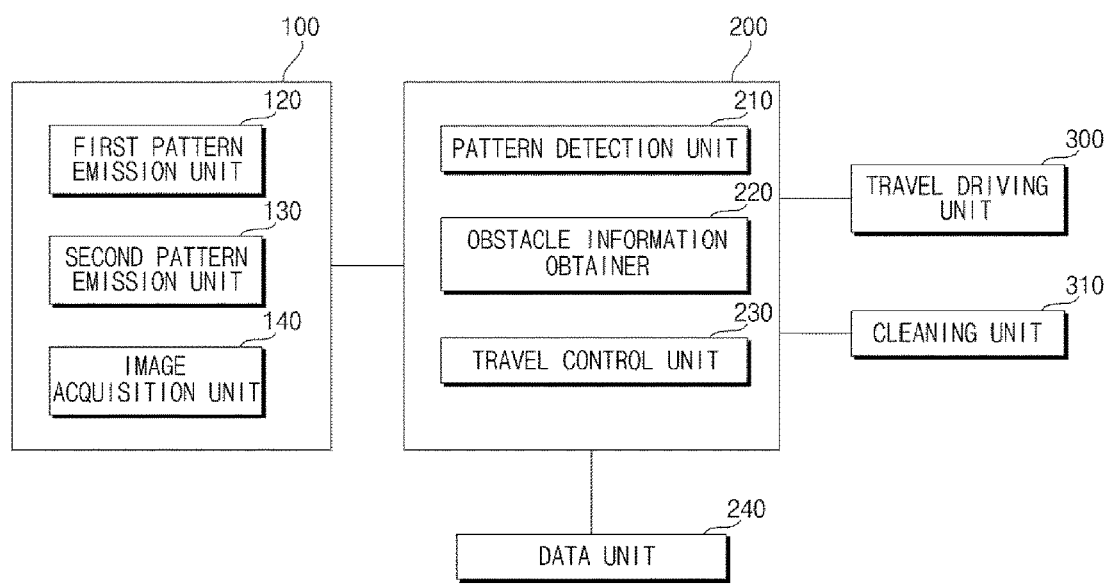
FIG. 5 is a block diagram illustrating main parts of the mobile robot illustrated in FIG. 1.

FIG. 5 shows a block diagram illustrating main parts of the mobile robot illustrated in FIG. 1. For example, the mobile robot 1 may includes a travel driving unit 300, a cleaning unit (or cleaning controller) 310, a data unit (or storage) 240, an obstacle detection unit 100, and a controller 200 which controls the overall operation of the mobile robot 1. The controller 200 may be implemented as one or more processors, or may be implemented as a hardware device. The controller 200 may include a travel control unit 230 which controls the travel driving unit 300. The left wheel driving motor and the right wheel driving motor are controlled independently from each other by the travel control unit 230, such that the main body 10 may move forward or rotate. Further, the controller 200 may include a pattern detection unit 210 which detects a pattern by analyzing data input from the obstacle detection unit 100; and an obstacle information obtainer 220 which determines an obstacle based on a pattern.

The pattern detection unit 210 may detect optical patterns P1 and P2 from an image acquired by the image acquisition unit 140. Hereinafter, description of the optical pattern will be made by using the first patterned light P1 and the second patterned light P2 illustrated in FIG. 1A, but the description may also be applied to the optical pattern of the alternative first patterned light P11 and the alternative second patterned light illustrated in FIG. 1B. The pattern detection unit 210 may detect features, such as dots, lines, sides, and the like, of pixels in the acquired image, and based on the detected features, the pattern detection unit 210 may detect optical patterns P1 and P2, or dots, lines, sides, and the like, of the optical patterns P1 and P2. The obstacle information obtainer 220 may determine the presence of an obstacle based on the pattern detected by the pattern detection unit 210, and determines the shape of an obstacle.

The travel driving unit 300 may include at least one driving motor to enable the mobile robot 1 to travel according to a control command of the travel control unit 230. As described above, the travel driving unit 300 may include the left wheel driving motor, which rotates the left wheel 36 (L), and the right wheel driving motor, which rotates the right wheel 36 (R).

The cleaning unit 310 operates the cleaning brush 34 to facilitate suctioning of dust or foreign substances around the robot cleaner 1, and operates the suction device to suck dust or foreign substances. The cleaning unit 310 controls the suction fan included in the suction unit that suctions foreign materials such as dust or waste, so that dust may be drawn into the foreign material collecting container through the suction hole.

The data unit 240 stores the acquired image input from the obstacle detection unit 100; reference data used for the obstacle information obtainer 220 to determine an obstacle; and obstacle information on the detected obstacle. Further, the data unit 240 may store control data to control the operation of the mobile robot 1; data according to a cleaning mode of the mobile robot 1; and a map generated or received from an external source. In addition, the data unit 240 may store data readable by a microprocessor, and may include Hard Disk Drive (HDD), Solid State Disk (SSD), Silicon Disk Drive (SDD), Read-Only Memory (ROM), Random-Access Memory (RAM), Compact Disk Read Only Memory (CD-ROM), a magnetic tape, a floppy disk, an optical data storage device, etc.

As shown in FIG. 5, the obstacle detection unit 100 may include the first pattern emission unit 120, the second pattern emission unit 130, and the image acquisition unit 140. As described above, the obstacle detection unit 100 may position the first pattern emission unit 120, the second pattern emission unit 130, and the image acquisition unit 140 at a front portion of the main body 10. From this position, the first pattern emission unit 120 and the second pattern emission unit 130 may emit the first patterned light P1 and the second patterned light P2 forward from the mobile robot 1, and the image acquisition unit 140 may capture an image of reflections of the emitted patterned light from obstacles or surfaces.

The controller 200 may store the acquired image in the data unit 240, and the pattern detection unit 210 analyzes the acquired image to detect a pattern. That is, the pattern detection unit 210 may extract an optical pattern obtained by emitting patterned light, which is emitted by the first pattern emission unit or the second pattern emission unit, to a floor or an obstacle. The obstacle information obtainer 220 determines an obstacle based on the extracted optical pattern. The controller 200 determines an obstacle based on the acquired image input from the obstacle detection unit 100, and controls the travel driving unit 300 to change a moving direction or a traveling path to bypass the obstacle while traveling.

When a cliff is identified in the travel path of the mobile robot 1, the mobile robot 1 may fall off the cliff if the mobile robot does not maneuver to avoid the cliff. In one example, the controller 200 may initially detect the cliff using a captured image, such as determining a change in light pattern in the acquired image. The controller 200 may then control the mobile robot 1 to verify the presence and location of the cliff using a cliff sensor 31 included at a bottom surface of the mobile robot 1. The controller may further control the mobile robot 1 to move so as to not to fall off the cliff. For example, in response to identifying a cliff, the controller 200 may control the travel driving unit 300 to travel along a path near the cliff but to maintain a sufficient distant to avoid falling off the cliff.

In the obstacle detection unit 100 according to the first exemplary embodiment, the first pattern emission unit 120 and the second pattern emission unit 130 may each include a light source and an Optical Pattern Projection Element (OPPE), which generates a predetermined pattern by modifying light emitted from the light source. The light source may be a laser diode (LD), a light emitting diode (LED), and the like. It is generally desirable to use the laser diode as the light source since the laser light has good monochromaticity, straightness, and connectivity properties, in comparison to other light sources, thereby enabling relatively finer distance measurement. In contrast, infrared light or visible light may have a relatively high deviation in precision in distance measurement according to factors, such as colors and materials of a target object. The OPPE may include a lens or a diffractive optical element (DOE). Depending on the configuration of the OPPE included in the pattern emission unit 120 and the pattern emission unit 130, light in various patterns may be emitted.

The first pattern emission unit 120 may emit the first patterned light P1 downward and forward from the main body 10. Accordingly, the first patterned light P1 may be emitted to the floor of an area to be cleaned. The first patterned light P1 may include a horizontal line segment. Further, the first patterned light P1 may also be in a cross shape in which the horizontal line segment is intersected by a vertical line segment.

As shown in FIG. 6, the first pattern emission unit 120, the second pattern emission unit 130, and the image acquisition unit 140 may be vertically aligned. For example, the image acquisition unit 140 is provided below the first pattern emission unit 120 and the second pattern emission unit 130, but the present disclosure is not limited thereto, and the image acquisition unit 140 may be dispose above the first pattern emission unit 120 and the second pattern emission unit 130 (e.g., by flipping the obstacle detection unit 100 holding the first pattern emission unit 120, the second pattern emission unit 130, and the image acquisition unit 140).

In certain embodiments, the first pattern emission unit 120 may provided on an upper portion of the obstacle detection unit 100 and may emit the first patterned light P1 downward and forward, so as to detect an obstacle located at a position lower than the first pattern emission unit 120. The second pattern emission unit 130 may be provided below the first pattern emission unit 120 and may emit the second patterned light P2 upward and forward, such that the second patterned light P2 may be emitted onto the wall, an obstacle, or a portion of the obstacle located higher than the second pattern emission unit 130. The second patterned light P2 may be formed to be different from the first patterned light P1. For example, second patterned light P2 may include a horizontal line. In one example, the horizontal line in the second patterned light P2 may be a continuous line segment, and in another example, the second patterned light P2 may be a discontinuous (e.g., dotted) line. Thus, the horizontal line segment in the first patterned light P1 and the second patterned light P2 may be visually distinguished based on whether a detected refection is associated with a continuous or intermittent pattern section.

Figure 2:
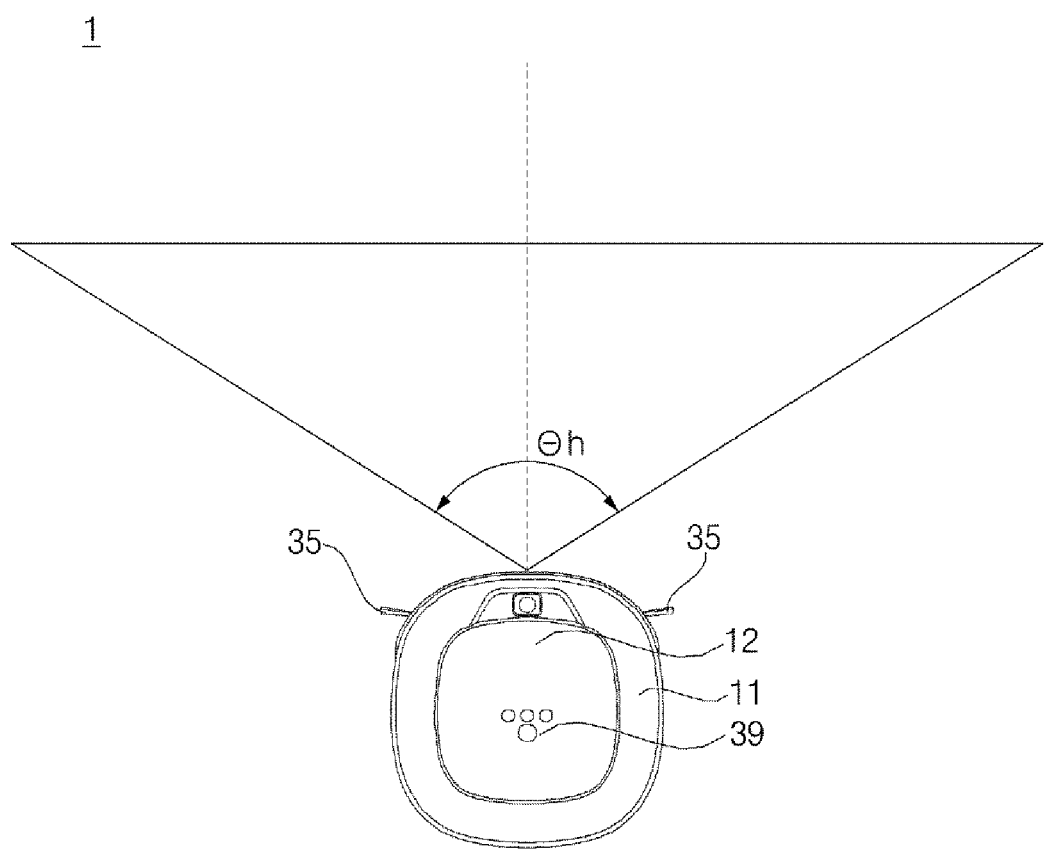
FIG. 2 is a diagram illustrating a horizontal view angle of the mobile robot illustrated in FIG. 1.

As illustrated in FIG. 2, an emission angle θh is a horizontal emission angle of the first patterned light P1 emitted by the first pattern emission unit 120. The emission angle θh may represent an angle formed between both ends of the horizontal line emitted by the first pattern emission unit 120, and is desirably set in a range of 130° to 140°, but is not limited thereto. The dotted line of FIG. 2 represents a direction forward of the mobile robot 1, and the first patterned light P1 may be formed to be symmetrical with respect to the dotted line (e.g., so that equal portions of the horizontal emission angle θh are included on each side of the dotted line). Similarly to the first pattern emission unit 120, a horizontal emission angle θh of the second pattern emission unit 130 may be set in a range of 130° to 140°, and in some embodiments, the second patterned light P2 may be emitted at the same horizontal emission angle as that of the first pattern emission unit 120. The second patterned light P2 may also be formed to be symmetrical with respect to the dotted line of FIG. 2.

As shown in FIG. 2, the width of the first patterned light P1 and the second patterned light P2 may vary in proportion to a distance from robot body, for a given horizontal emission angle θh. As described below, the width of a detected optical pattern associated with a refection of the horizontal line segment Ph from an obstacle, as detected by image obtainer 140, may be used to determine a distance of the obstacle from the main body 10.

The image acquisition unit 140 may capture a forward image of the main body 10. As used herein, the term "front" is associated with a direction in which the main body 10 is travelling and/or a portion of the main body 10 wherein the obstacle sensing unit 100 is mounted. For example, the first patterned light P1 and the second patterned light P2 may be present in on the image acquired by the image acquisition unit 140 (hereinafter referred to as an acquired image). Images of the first patterned light P1 and the second patterned light P2 displayed on the acquired image are hereinafter referred to as "optical patterns." The optical patterns represent reflections of the first patterned light P1 and the second patterned light P2 incident on an obstacle or surface represented in an image, and the same reference numerals are used herein such that the first patterned light P1 is associated with a first optical pattern P1, and the second patterned light P2 is associated with a second optical pattern P2.

The image acquisition unit 140 may include a digital camera, which converts an image of a subject into an electric signal, converts the electric signal into a digital signal, and then stores the digital signal in a memory device. The digital camera includes an image sensor (not shown) and an image processor (not shown). The image sensor is a device that converts an optical image into an electrical signal, and is formed as a chip having a plurality of photodiodes integrated therein. For example, the photodiodes may be pixels. When light, having passed through the lens, forms an image on the chip, charges are accumulated in the respective pixels constructing the image, and the charges accumulated in the pixels are converted into an electrical signal (for example, voltage). As is well known, a Charge Coupled Device (CCD), a Complementary Metal Oxide Semiconductor (CMOS), and the like, may be used as the image sensor. The image processor generates a digital image based on an analog signal output from the image sensor. The image processor includes: an A/D converter to convert the analog signal into a digital signal; a buffer memory to temporarily store digital data according to the digital signal output from the A/D converter; and a digital signal processor (DSP) to generate a digital image by processing the data stored in the buffer memory.

The pattern detection unit 210 may detect features, such as dots, lines, sides, and the like, of pixels in the acquired image, and based on the detected features, the pattern detection unit 210 may detect optical patterns P1 and P2, or dots, lines, sides, and the like, of the optical patterns P1 and P2. For example, the pattern detection unit 210 may extract line segments formed by consecutive pixels that are brighter than neighboring pixels, so as to extract a horizontal line, which forms the first optical pattern P1, and a horizontal line which forms the second optical pattern P2. However, the pattern extraction method is not limited thereto, and various methods of extracting a desired pattern are already known in the art, which may be used by the pattern detection unit 210 to extract the first optical pattern P1 and the second optical pattern P2.

Figure 7:
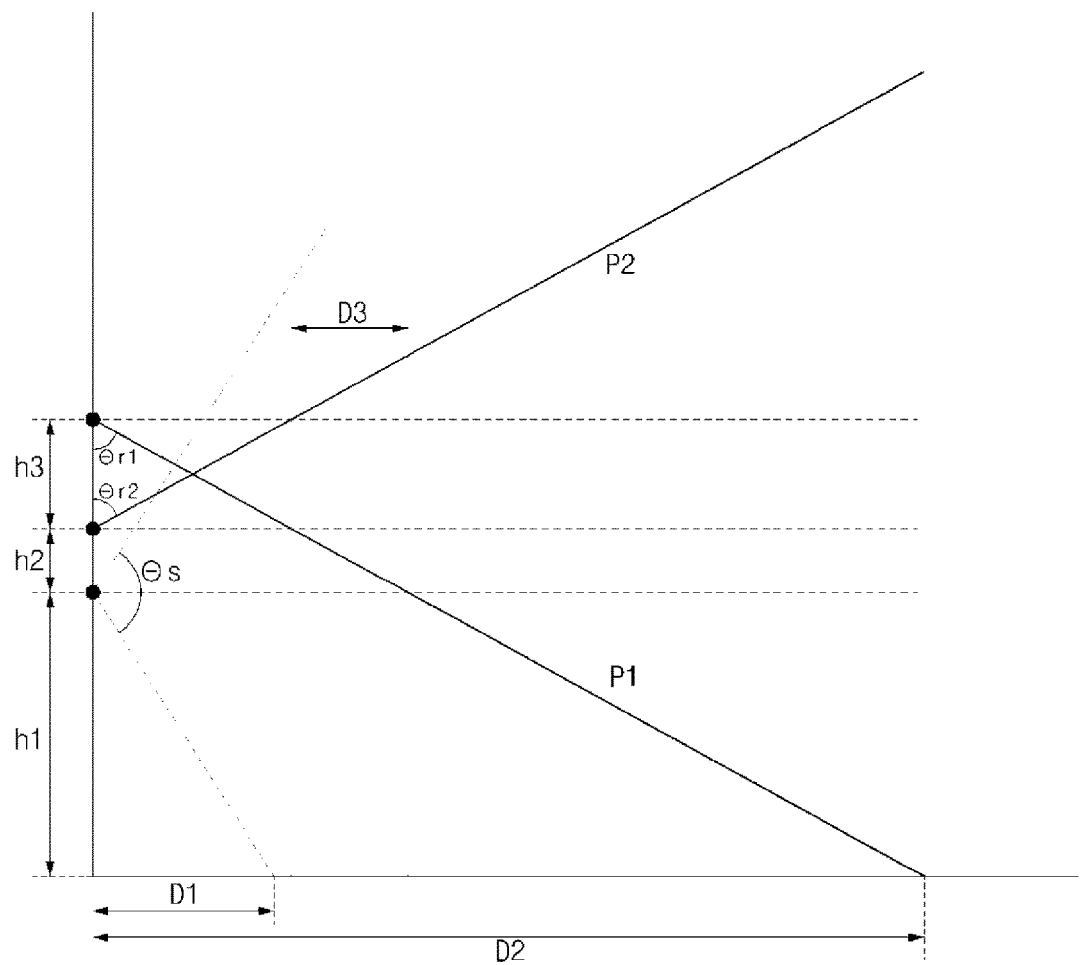
FIG. 7 is a diagram illustrating a pattern emission range and an obstacle detection range of the obstacle detection unit illustrated in FIG. 6.

As illustrated in FIG. 7, the first pattern emission unit 120 and the second pattern emission unit 130 are vertically spaced apart from each other by a distance h3. Additionally, the first pattern emission unit 120 and the second pattern emission unit 130 may be provided symmetrical to each other. For example, the first pattern emission unit 120 may emits the first patterned light P1 downward at a given angle, and the second pattern emission unit 130 may emit the second patterned light P2 upward at a similar angle, such that the first patterned light intersects the second patterned light.

As shown in FIG. 7, the image acquisition unit 140 may be provided below the second pattern emission unit 130 and may be spaced apart therefrom by a distance h2. The image acquisition unit 140 may capture a forward image of the main body 10 at a view angle of θs with respect to a vertical direction. The image acquisition unit 140 may be installed at a position spaced apart from a bottom surface by a distance h1. In consideration of a bumper (not shown) formed at the front bottom end of the main body 10 of the mobile robot 1, or a shape of structure for traveling or cleaning, the image acquisition unit 140 is desirably installed at a position that does not interrupt photographing of a forward image.

As previously described, the first pattern emission unit 120 or the second pattern emission unit 130 may be installed such that an optical axis of lenses included in the pattern emission unit 120 and the pattern emission unit 130 is oriented to form a constant emission angle. For example, the first pattern emission unit 120 may emit the first patterned light P1 downward at a first emission angle θr1; and the second pattern emission unit 130 may emit the second patterned light P2 at a second emission angle θr2. In this configuration, the first emission angle and the second emission angle are may be different from each other or may or may be substantially identical to each other. The first emission angle and the second emission angle are desirably set in a range of 50° to 75°, but are not limited thereto. For instance, the first emission angle may be set in a range of 60° to 70°, and the second emission angle may be set in a range of 50° to 55°. The emission angle may be changed based on the structure of a bumper at a lower portion of the mobile robot 1, a lower object detection distance, and/or the height of an upper portion to be detected.

When the patterned light, emitted by the first pattern emission unit 120 and/or the second pattern emission unit 130, is incident on an obstacle, the positions of the optical patterns P1 and P2 vary depending on the distance between the obstacle and the first pattern emission unit 120. For example, when the first patterned light P1 and the second patterned light P2 are incident on a specific obstacle, as the obstacle is located closer to the mobile robot 1, the first optical pattern P1 is displayed at a higher position in the acquired image and the second optical pattern P2 is displayed at a lower position. In one implementation, the movable robot 1 may store data identifying respective heights of the first optical pattern P1 and/or the second optical pattern P2 in an image of an obstacle positioned at a known distance (e.g., 10 cm) from mobile robot 1. Than, the location of an obstacle may be estimated based on comparing the height of the first optical pattern P1 and/or the second optical pattern P2 in an image to the stored height values associated with the obstacle positioned at a known distance.

The image acquisition unit 140 is arranged such that the optical axis of the lens is oriented in a horizontal direction, and FIG. 7 illustrates an angle of view θs that is set at a value equal to or higher than 100° and preferably in a range of 100° to 110°, but is not limited thereto. Further, the distance from the floor of an area to be cleaned to the image acquisition unit 140 may be set in a range of approximately 60 mm to 70 mm. The captured image depicts a portion of the floor of the area to be cleaned that is farther than distance D1 from the mobile robot 1.

In FIG. 7, a distance D2 is where the first pattern light P1 would be emitted from first pattern emission unit 120 if no obstacle is present on a flat floor. When an obstacle is located at the distance D2, an image of the obstacle, on which the first patterned light P1 is incident, may be acquired by the image acquisition unit 140. In the case where an obstacle is closer to the mobile robot 1 than D2, the first optical pattern, corresponding to the emitted first patterned light P1, is displayed at a higher position than a reference position ref1. The reference position ref1 is a position where the first optical pattern is displayed when the main body 10 is placed on a flat surface. When the first optical pattern is emitted to D2, the image acquisition unit 140 may be set as a position where the first optical pattern is captured. The reference position ref1 is a reference to determine a normal state, i.e., a state where there is no obstacle in front of the main body 10 and the floor is a flat surface.

Here, the distance from the main body 10 to D1 is preferably in a range of 100 mm to 150 mm; and the distance from the main body 10 to D2 is preferably in a range of 180 mm to 280 mm, but the distance is not limited thereto. D3 indicates a distance from the most protruding part of the front surface of the main body 10 to a position where the second patterned light is incident. The main body 10 detects an obstacle while moving, such that D3 is a minimum distance required to allow the main body 10 to detect an obstacle, located forward (upward) of the main body 10, without colliding with the obstacle.

When the first optical pattern P1 is included at ref1 in the acquired image, and then partially or entirely disappears from the captured image as the main body 10 travels for the obstacle information obtainer 220 may determine that there is a cliff near the mobile robot 1. When the first optical pattern is not displayed on the acquired image, the obstacle information obtainer 220 may identify a cliff located in front of the mobile robot 1. In the case where there is a cliff (for example, stairs) in front of the mobile robot 1, the first patterned light is not incident onto the floor, such that the first optical pattern P1 disappears from the acquired image. Based on a length of D2, the obstacle information obtainer 220 may determine that there is a cliff in front of the main body 10 at a position spaced apart from the main body 10 by D2. In this case, when the first patterned light P1 is in a cross shape, only the vertical line is displayed without the horizontal line, such that the obstacle information obtainer 220 may determine the cliff.

Further, in the case where a portion of the first optical pattern is not displayed, the obstacle information obtainer 220 may determine that there is an obstacle on the left side or the right side of the mobile robot 1. For example, when a portion of the right side of the first optical pattern is not displayed, the obstacle information obtainer 220 may determine that the cliff is located on the right side thereof. In one example, based on the identified cliff information, the travel control unit 230 may control the travel driving unit 300 so that the mobile robot 1 may travel along a path that does not lead to the cliff.

In another example, when a cliff is detected in front of the mobile robot 1 based on the captured image, the travel control unit 230 may control the mobile robot 1 to move forward a distance, for example, the distance D2 or a distance shorter than the distance D2, to verify the presence of a cliff by using a cliff sensor installed on the bottom of the main body 10. Thus, the mobile robot 1 may first identify a cliff based on the acquired image, and then may verify the presence of the cliff by using the cliff sensor after traveling a predetermined distance.

Figure 8:
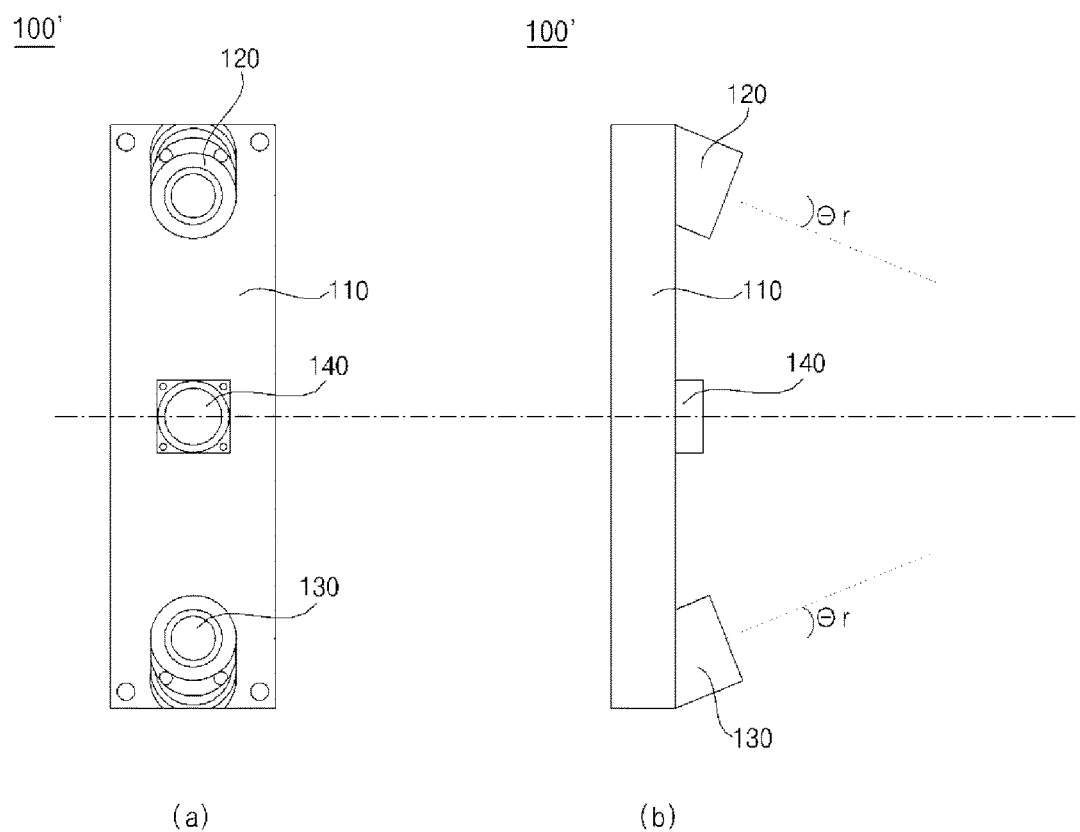
FIG. 8 is a front view and a lateral view of an obstacle detection unit according to a second exemplary embodiment of the present disclosure.
Figure 9:
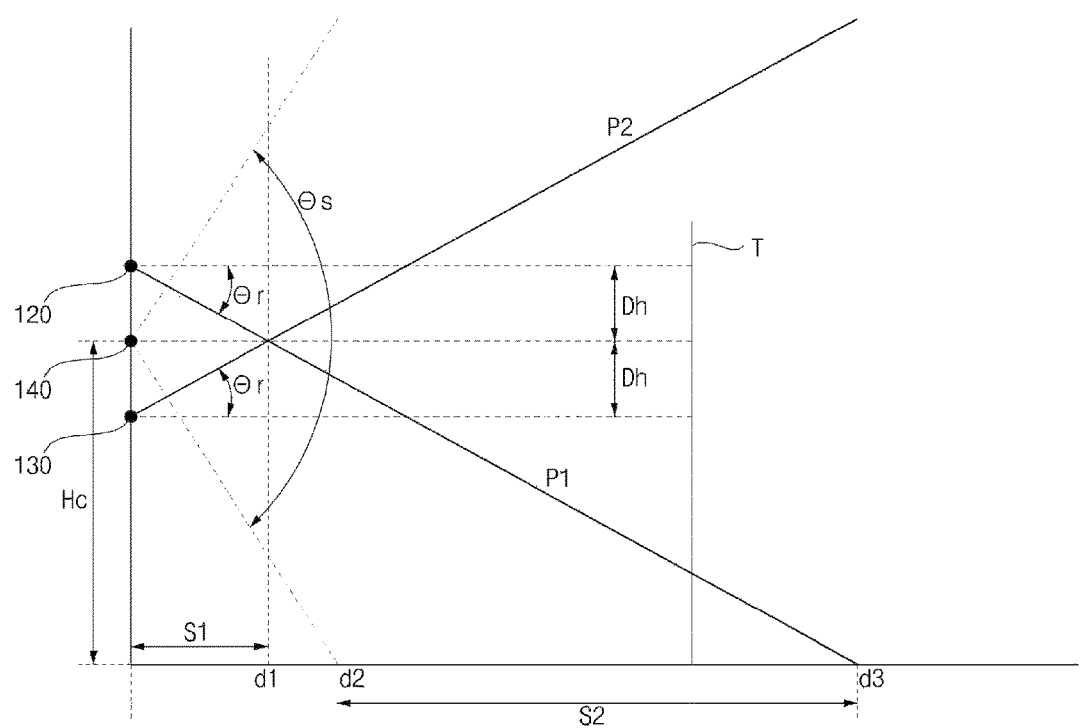
FIG. 9 is a diagram illustrating a pattern emission range and an obstacle detection range of the obstacle detection unit illustrated in FIG. 8.

FIG. 8 is a front view and a lateral view of an obstacle detection unit according to a second exemplary embodiment of the present disclosure; and FIG. 9 is a diagram illustrating a pattern emission range and an obstacle detection range of the obstacle detection unit illustrated in FIG. 8. As illustrated in (a) and (b) of FIG. 8, an obstacle detection unit 100' according to the second exemplary embodiment includes a first pattern emission unit 120, a second pattern emission unit 130, and an image acquisition unit 140. The same reference numerals will be used to indicate the same elements as those of the obstacle detection unit 100 according to the first exemplary embodiment, and description of the same elements will be omitted.

The obstacle detection unit 100' may further include a module frame 110 which is fixed at a front portion of the casing 11 and is vertically elongated, but in some embodiments, the first pattern emission unit 120, the second pattern emission unit 130, and/or the image acquisition unit 140 may be directly fixed to the casing 11 without the module frame 110. In the obstacle detection unit 100' according to the second exemplary embodiment, the first pattern emission unit 120, the image acquisition unit 140, and the second pattern emission unit 130 may be vertically aligned. In the example shown in FIG. 8, the image acquisition unit 140 may be interposed between the first pattern emission unit 120 and the second pattern emission unit 130.

In the manner previously described, the first pattern emission unit 120, may be provided at the top of obstacle detection unit 100' and may emit the first patterned light downward and forward from the main body 10. Similarly, the second pattern emission unit 130 may be provided at the bottom of the obstacle detection unit 100' and may emits the second patterned light upward and forward from the main body 10. The first patterned light P1 may be emitted to the floor of an area to be cleaned. The second patterned light P2 may be emitted to an obstacle located at a position higher than at least the second pattern emission unit 130 from the floor of the area to be cleaned, or may be emitted to a portion of the obstacle.

The image acquisition unit 140 may acquire a forward image of the main body 10. Particularly, the first patterned light P1 and the second patterned light P2 are displayed on the image (hereinafter referred to as an acquired image) acquired by the image acquisition unit 140, in which images of the first patterned light P1 and the second patterned light P2 displayed on the acquired image will be hereinafter referred to as optical patterns; and as the optical patterns are projected on the image sensor, of the first patterned light P1 and the second patterned light P2 incident on an actual space. The first patterned light P1 and the second patterned light P2 may be shown in the image, respectively, as the first optical pattern P1 and the second optical pattern P2.

As illustrated in FIG. 9, in the obstacle detection unit 100' according to the second exemplary embodiment, the first pattern emission unit 120 may be provided above the image acquisition unit 140 at a position spaced apart from the image acquisition unit 140 by a distance Dh; and the second pattern emission unit 130 may be provided below the image acquisition unit 140 at a position spaced apart from the image acquisition unit 140 by a similar distance Dh. An angle formed between a horizontal line and the emission direction of the first pattern emission unit 120 or the second pattern emission unit 130 will be defined as a vertical emission angle. Specifically, the vertical emission angle may be defined as an angle formed between a horizontal line and the direction of the optical axis of lenses included in each of the pattern emission units 120 and 130.

A first vertical emission angle of the first pattern emission unit 120 and a second vertical emission angle of the second pattern emission unit 130 may have similar vertical emission angles θr. For example, the first pattern emission unit 120 may emits the first patterned light P1 at a downward angle θr with respect to the horizontal line; and the second pattern emission unit 130 may emits the second patterned light P2 at an upward angle θr with respect to the horizontal line. The angle θr is preferably set in a range of 20° to 30°, but is not limited thereto.

As described above, the first pattern emission unit 120 and the second pattern emission unit 130 may be provided to be symmetrical to each other, and the image acquisition unit 140 may be interposed therebetween. For example, the first pattern emission unit 120 and the second pattern emission unit 130 may be configured to emit light at similar vertical emission angle θr, but in opposite directions.

Such symmetrical structure allows for simplified calibration or initialization of a product. When the patterned light, emitted by the first pattern emission unit 120 or the second pattern emission unit 130 is incident on an obstacle, positions of the optical patterns P1 and P2 may vary depending on the distance from the obstacle to the first pattern emission unit 120. For example, when the first patterned light P1 and the second patterned light P2 are incident on a specific obstacle, the first optical pattern P1, particularly a horizontal line pattern Ph, is displayed at a higher position in the acquired image and the second optical pattern P2 is displayed at a lower position in the captured as the mobile robot 1 moves closer to the obstacle. As previously described, the distance between the mobile robot 1 and the obstacle may be estimated based on heights of the first patterned light P1 and the second patterned light P2 in a captured image. For example, the heights of the first patterned light P1 and the second patterned light P2 in the captured image may be compared to height associated with the first patterned light P1 and the second patterned light P2 for an obstacle at a given location.

However, in order to perform such process precisely, it is a prerequisite to arrange the first pattern emission unit 120 and the second pattern emission unit 130 to precisely emit light at a predetermined vertical emission angle θr. Such prerequisite may be checked during calibration. The calibration process may be performed as follows. The obstacle detection unit 100' is generally fixed, and an incident plane T (see FIG. 7) having a plane surface is vertically provided in front of the obstacle detection unit 100' with a predetermined distance therebetween. The incident plane T is desirably located at a position where the first patterned light P1 may be incident.

Subsequently, light is emitted by the first pattern emission unit 120, and an image is acquired by the image acquisition unit 140. The acquired image has the first optical pattern P1 incident on the incident plane T. In this case, the distance from the obstacle detection unit 100 to the incident plane T is already known, such that in the case where the obstacle detection unit 100' is normally manufactured without fault, a horizontal line Ph of the first optical pattern P1 is required to be displayed at a designated position ref1 (hereinafter referred to as a reference position) on the acquired image.

An emission direction of the second pattern emission unit 130 may be checked by inverting the obstacle detection unit 100' so that the obstacle detection unit 100' is upside down, and then by repeating the above-described calibration process. That is, after the obstacle detection unit 100' is inverted, and the second pattern emission unit 130 is located above the image acquisition unit 140, the second pattern emission unit 130 emits light, and the image acquisition unit 140 acquires an image, in which the second optical pattern P2 projected on the incident plane T is displayed. In this case, if the second pattern emission unit 130 is in a normal condition, the second optical pattern P2 will be detected at the reference position ref1. The image acquisition unit 140 is arranged such that the optical axis of the lens is oriented in a horizontal direction, and θs indicates an angle of view of the image acquisition unit 140, and is set at a value equal to or higher than 100°, preferably in a range of 100° to 110°, but is not limited thereto. Such calibration process is also applied to the obstacle detection unit 100 according to the first exemplary embodiment.

The distance from the floor of an area to be cleaned to the image acquisition unit 140 may be set in a range of approximately 145 mm to 155 mm. In this case, in the image acquired by the image acquisition unit 140, the floor of the area to be cleaned is displayed after a point indicated as D2, and on the floor displayed in the acquired image, S2 is a region from the center of the first optical pattern P1 (a point where the horizontal line Ph and the vertical line Pv intersect) to D3. Particularly, in the case where there is an obstacle in the region S2, the image acquisition unit 140 may acquire an image of the first patterned light P1 which is incident on the obstacle. In this case, the distance from the main body 10 to D2 is preferably set in a range of 100 mm to 120 mm, and D3 is located at a position spaced apart from the mobile robot 1 by approximately 400 mm, but is not limited thereto.

Further, S1 (a region extending from the mobile robot 1 to D1) illustrated in FIG. 9 indicates a region where the position of the first optical pattern P1 and the position of the second optical pattern P2 are upside down. In the case where there is an obstacle in the region S1, the first patterned light P1 is located above the second patterned light P2 in the acquired image, in which D1 is located at a position spaced apart from the mobile robot 1 desirably by 70 mm to 80 mm, but is not limited thereto.

Figure 10:
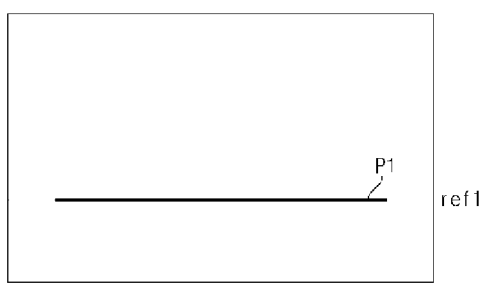
FIG. 10 is a diagram illustrating patterned light emitted by a first pattern emission unit illustrated in FIG. 1A.
Figure 10:
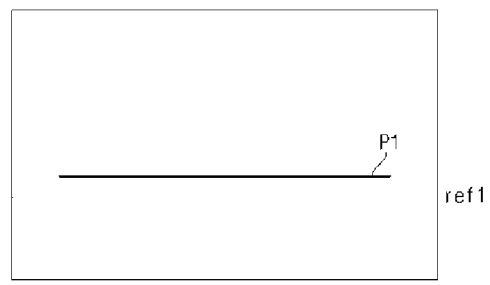
Figure 10:
Figure 10:
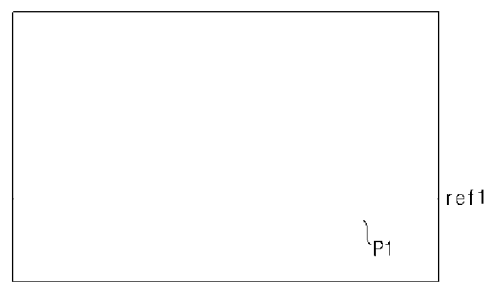
Figure 10:
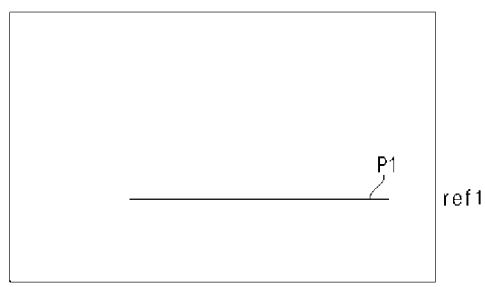

FIG. 10 is a diagram illustrating light emitted by a first pattern emission unit illustrated in FIG. 1A (i.e., patterned light P1 is a horizontal line segment). Once an acquired image is input, the pattern detection unit 210 detects the first optical pattern or the second optical pattern from the acquired image input by the image acquisition unit 140, and transmits the detected first optical pattern or second optical pattern to the obstacle information obtainer 220. The obstacle information obtainer 220 analyzes the first optical pattern or second optical pattern, which is detected from the acquired image, and compares the position of the first optical pattern with the reference position ref1 to determine an obstacle. As illustrated in FIG. 10(a), in the case where the horizontal line of the first optical pattern P1 is below the reference position 1, the obstacle information obtainer 220 determines that the mobile robot is in a normal state. The normal state refers to a state where the floor is flat and even, and there is no obstacle in front of the mobile robot, such that the mobile robot continues traveling.

In the case where there is an obstacle in front of the mobile robot, the second optical pattern P2 is incident on the obstacle and is displayed on the acquired image, such that in a normal state, the second optical pattern P2 is generally not displayed. As illustrated in FIG. 10(b), in the case where the horizontal line of the first optical pattern P1 is above the reference position ref1, the obstacle information obtainer 220 determines that there is an obstacle in front of the mobile robot.

In the case where an obstacle is detected by the obstacle information obtainer 220 as illustrated in FIG. 10, the travel control unit 230 controls the travel driving unit 300 to bypass the obstacle while traveling. The obstacle information obtainer 220 may determine the position and size of the detected obstacle based on the positions of the first optical pattern P1 and the second optical pattern P2, and whether the second optical pattern P2 is displayed. In addition, the obstacle information obtainer 220 may determine the position and size of the obstacle based on a change in the first optical pattern and the second optical pattern displayed on the acquired image while traveling. The travel control unit 230 may determine whether to continue traveling or bypass an obstacle based on the input information on the obstacle, and may control the travel driving unit 300 based on the determination. For example, when the height of an obstacle is lower than a predetermined height, or when the mobile robot may pass through a space between an obstacle and a floor, the travel control unit 230 may determine that it is possible to continue traveling in a current direction (i.e., there is no need to change directions to avoid a detected obstacle).

As illustrated in FIG. 10(c), the first optical pattern P1 may be displayed at a lower position than the reference position ref1. In the case where the first optical pattern P1 is displayed at a lower position than the reference position ref1, the obstacle information obtainer 220 determines that there is a downhill slope. In the case where there is a cliff, the first optical pattern P1 disappears, such that a downhill slope may be differentiated from a cliff.

In the case where the first optical pattern is not displayed as illustrated in FIG. 10(d), the obstacle information obtainer 220 determines that there is an obstacle in a traveling direction. Further, in the case where a portion of the first optical pattern is not displayed as illustrated in FIG. 10(e), the obstacle information obtainer 220 may determine that there is a cliff on the left side or the right side of the main body 10. In the embodiment, the obstacle information obtainer 220 determines that there is a cliff on the left side of the main body 10. Moreover, in the case where the first optical pattern P1 is in a cross shape, the obstacle information obtainer 220 may determine an obstacle by considering both the position of the horizontal line and the length of the vertical line.

Figure 11:
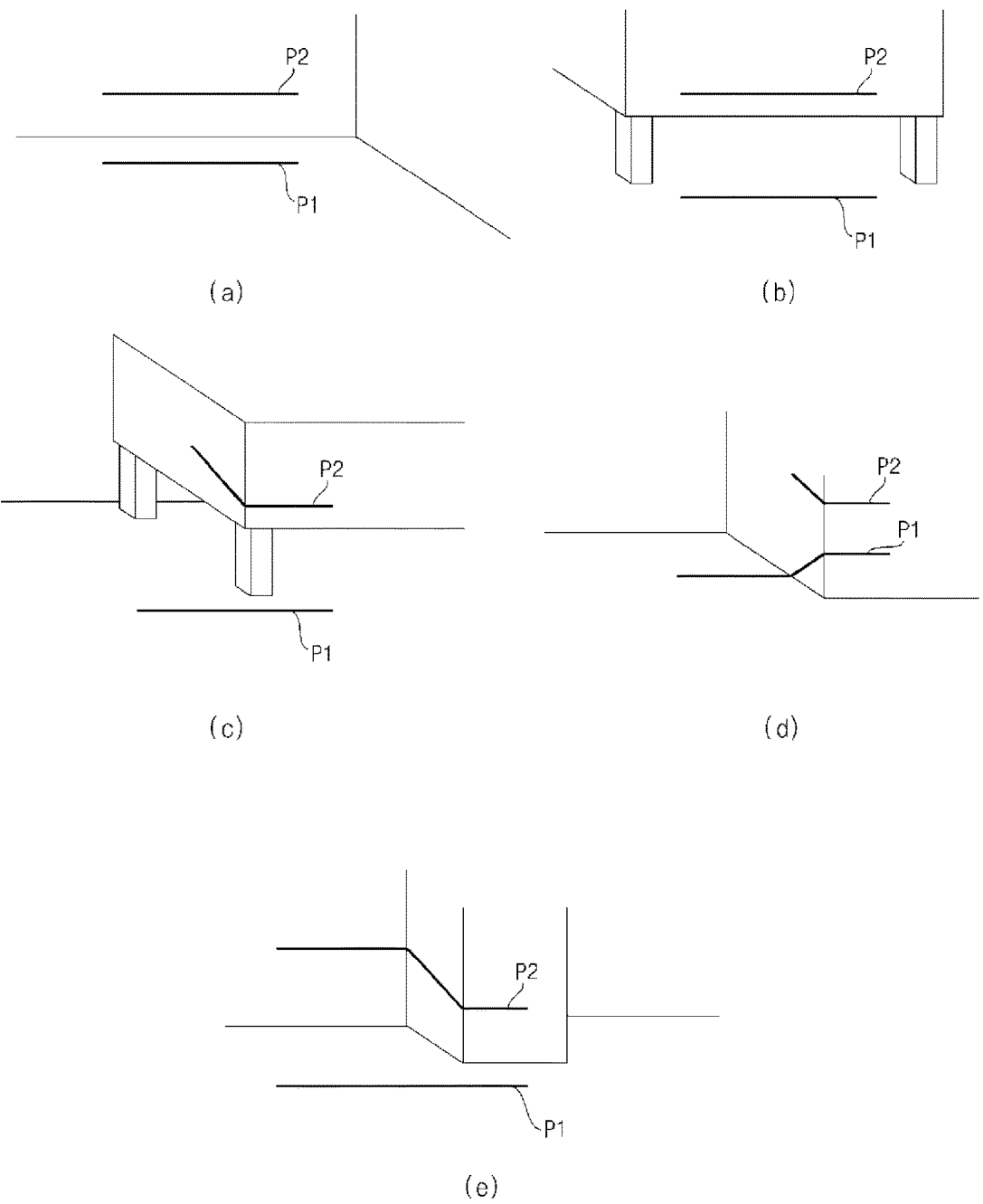
FIG. 11 is a diagram illustrating an example of a shape of a pattern emitted onto an obstacle of the mobile robot illustrated in FIG. 1A.

FIG. 11 is a diagram illustrating an example of a shape of a pattern emitted onto an obstacle of the mobile robot illustrated in FIG. 1A. As illustrated in FIG. 11, the obstacle information obtainer 220 may determine the position, size, and shape of an obstacle in such a manner that the patterned light, emitted by the obstacle detection unit 100, is incident on the obstacle, and an image displaying the optical pattern is acquired.

In the case where there is a wall in front of the mobile robot while traveling, as illustrated in FIG. 11 (a), the first patterned light is incident on the floor, and the second patterned light is incident on the wall. Accordingly, the first optical pattern P1 and the second optical pattern P2 are displayed as two horizontal lines on the acquired image. In the case where the distance between the main body 10 and the wall is longer than D2, the first optical pattern P1 is displayed on the reference position ref1, but the second optical pattern is also displayed, such that the obstacle information obtainer 220 may determine that there is the obstacle.

In the case where the main body 10 moves closer to the wall, with the distance therebetween being less than D2, the first patterned light is incident not on the floor but on the wall, such that the first optical pattern is displayed on the acquired image at a position higher than the reference position ref1, and the second optical pattern is displayed above the first optical pattern. As the main body 10 moves closer to the obstacle, the second optical pattern is displayed at a lower position, such that the second optical pattern is displayed at a lower position compared to the case where the distance between the wall and the main body 10 is longer than D2; but the second patterned light is displayed above the reference position ref1 than the first optical pattern. Accordingly, the obstacle information obtainer 220 may calculate the distance from the main body 10 to the wall, which is an obstacle, based on the first optical pattern and the second optical pattern.

As illustrated in FIG. 11(B), in the case where there is an obstacle such as a bed, chest of drawers, and the like, the first patterned light P1 and the second patterned light P2 are incident on the floor and the obstacle respectively, as two horizontal lines. The obstacle information obtainer 220 determines the obstacle based on the first optical pattern and the second optical pattern. Based on the position of the second optical pattern, and a change of the second optical pattern, which is shown while the main body approaches the obstacle, the obstacle information obtainer 220 may determine a height of the obstacle. Then, the travel control unit 230 determines whether it is passable through a space below the obstacle, to control the travel driving unit 300 based on the determination. For example, in the case where there is an obstacle, such as a bed, in an area to be cleaned, in which a space is formed between the obstacle and the floor, the travel control unit 230 may recognize the space, and may determine whether to pass through or bypass the obstacle by identifying the height of the space. In response to determination that the height of the space is less than the height of the main body 10, the travel control unit 230 may control the travel driving unit 300 so that the main body 10 may bypass the obstacle while traveling. By contrast, in response to determination that the height of the space is greater than the height of the main body 10, the travel control unit 230 may control the travel driving unit 300 so that the main body 10 may enter or pass through the space.

While the first optical pattern and the second optical pattern are displayed as two horizontal lines as illustrated in FIG. 11(a), the obstacle information obtainer 220 may differentiate the first optical pattern and the second optical pattern, as the distance between the first optical pattern and the second optical pattern is different. Further, as illustrated in FIG. 11(a), as the main body 10 gets closer to an obstacle, the first optical pattern is displayed at a position higher than the reference position. However, as illustrated in FIG. 11(b), in the case of an obstacle located at a higher position, although the main body 10 moves closer to an obstacle by a predetermined distance, the first optical pattern P1 is displayed at the reference position ref1, and the position of the second optical pattern P2 is changed, such that the obstacle information obtainer 220 may differentiate the types of obstacle.

As illustrated in FIG. 11 (c), in the case where an obstacle is a corner of a bed or chest of drawers, the first patterned light P1 is emitted to the floor as a horizontal line; and the second patterned light P2 is emitted to the corner of the obstacle, with a portion thereof being displayed as a horizontal line, and the remaining portion being incident on the obstacle and displayed as an oblique line. As the main body 10 moves further away from the obstacle, the second optical pattern is displayed at a higher portion, such that when the second patterned light P2 is incident on the side of the obstacle, the second optical pattern is displayed as an oblique line bending to an upper side than the horizontal line displayed in the case of emission to the front portion.

As illustrated in FIG. 11(d), in the case where the main body 10 moves closer to the corner of the wall by more than a predetermined distance, a portion of the first patterned light P1 is displayed as the horizontal line at a position higher than the reference position; a portion of the first patterned light P1 is emitted to the side of the corner, and is displayed as an oblique line bending to a lower side; and with respect to the floor, the first patterned light P1 is displayed as a horizontal line.

As illustrated in FIG. 11(c), the second patterned light is displayed as a horizontal line and a portion of the second patterned light P1 emitted to the side of the corner is displayed as an oblique line angled toward an upper portion. Further, as illustrated in FIG. 11(e), with respect to an obstacle projecting from the surface of a wall, the first optical pattern is displayed as a horizontal line at the reference position ref1; and a portion of the second optical pattern P2 emitted on the projecting surface is displayed as a horizontal line, another portion thereof emitted to the side of the projecting surface is displayed as an oblique line bending to an upper side, and a remaining portion thereof emitted to the surface of a wall is displayed as a horizontal line. In this manner, based on the position and shape of the first patterned light and the second patterned light, the obstacle information obtainer 220 may determine the position, shape, and size (height) of the obstacle.

Figure 12:
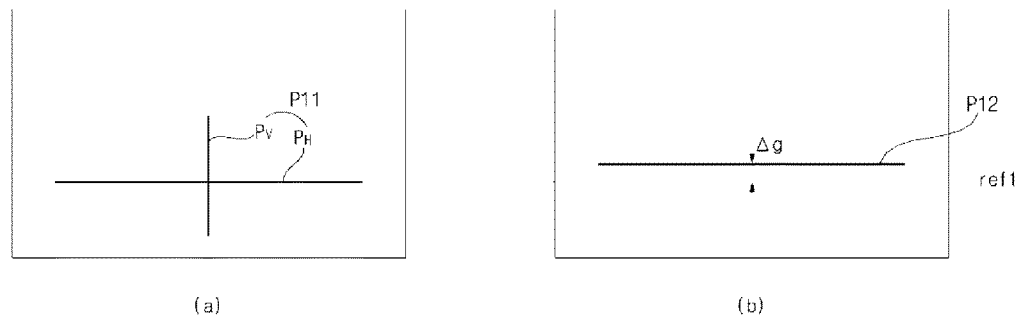
FIG. 12 is a diagram illustrating patterned light illustrated in FIG. 1B.

FIG. 12 is a diagram illustrating patterned light illustrated in FIG. 1B. FIG. 12(a) illustrates an example in which the first optical pattern P1 displayed on the acquired image, which is the case where the horizontal line Ph is detected at the reference position ref1. As illustrated in FIG. 12(b), in the case where the second optical pattern P2 is displayed, on the acquired image, above the reference position ref1 by a distance $\Delta g$, a vertical emission angle of the second pattern emission unit 130 is smaller than a predetermined value $\theta r$, such that it is desired to adjust the vertical emission angle of the second pattern emission unit 130.

However, if the distance $\Delta g$ is in a predetermined error range, the distance $\Delta g$ may be stored in a data storage, and then may be used later to obtain a distance from the position of the second optical pattern P2, displayed on the acquired image, to an obstacle, in which the distance may be obtained more precisely by compensating for the position of the second optical pattern P2 using the distance $\Delta g$.

Figure 13:
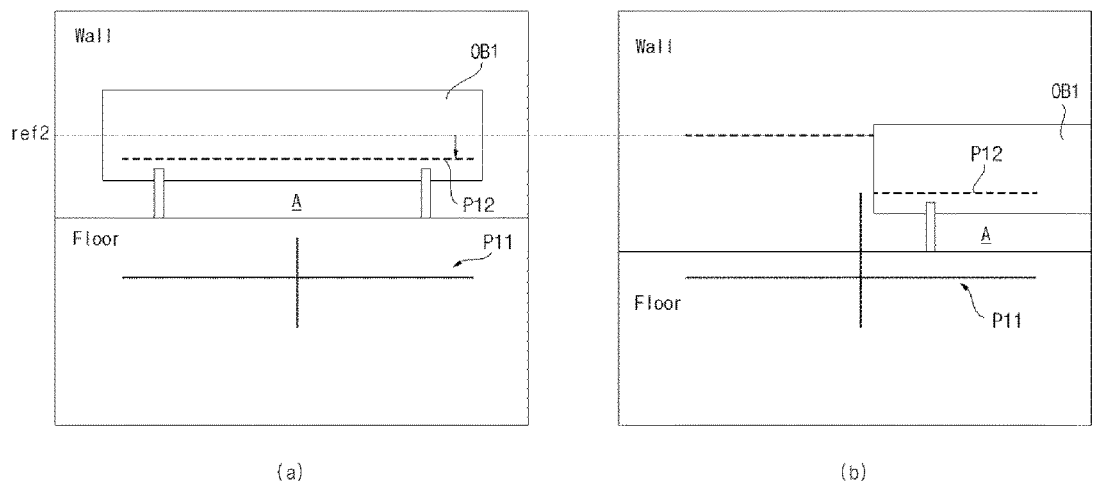
FIG. 13 is a diagram illustrating an image acquired according to a change in position of the mobile robot illustrated in FIG. 1B.

FIG. 13 is a diagram illustrating an image acquired according to a change in position of the mobile robot illustrated in FIG. 1B. In FIG. 13(a), image is acquired in the case when mobile robot is at position 1, and obstacle 1 is in front of the mobile robot. FIG. 13(b) illustrates an image acquired in the case where the position of the mobile robot is changed to position 2. In the case where there is an obstacle OB1, such as a bed, in an area to be cleaned, in which a space A is formed between the obstacle OB1 and the floor, the space A may be recognized, and the height of the space A may be desirably identified, such that it may be determined whether to pass through or bypass the obstacle OB1.

For example, as illustrated in FIG. 13(a), when the first patterned light P11 is incident on the floor in the space A, and the second patterned light P12 is incident on a structure (for example, frame supporting a bed mattress) positioned on the space A, the obstacle information obtainer 220 included in the controller 200 may recognize that there is an obstacle above a portion where the first patterned light P11 is incident, and particularly, may determine the distance from the mobile robot 1 to the obstacle OB1 based on the position of the second optical pattern P12 displayed on the acquired image. Further, the vertical emission angle of the second pattern emission unit 130 may be constant, such that based on the distance from the mobile robot 1 to the obstacle OB1, the obstacle information obtainer 220 may determine a height from the floor of an area to be cleaned to a portion where the second patterned light P2 is incident. Accordingly, based on these types of information, the obstacle information obtainer 220 may determine the height of the space A. In response to determination that the height of the space A is less than the height of the main body 10, the travel control unit 230 may control the travel driving unit 300 so that the main body 10 may bypass the obstacle OB1; by contrast, in response to determination that the height of the space A is greater than the height of the main body 10, the travel control unit 230 may control the travel driving unit 300 so that the main body 10 may enter or pass through the space A.

As illustrated in FIG. 13(b), when the vertical line Pv of the first patterned light P11 extends to the wall, the horizontal line Ph may be incident on the floor. Additionally, the second patterned light P12 may be partially incident on the obstacle OB1, such that a portion of the second patterned light P12 is incident on the obstacle OB1, with other portion of the of the second patterned light P12 is incident on the wall. The obstacle information may then be obtained based on only the first optical pattern P11 displayed on the acquired image if there is no second pattern emission unit 130. In this case, only the fact that there is a wall in front of the mobile robot may be identified.

However, certain embodiments, the second pattern emission unit 130 may be provided, thereby further identifying that there is the obstacle OB1 between the mobile robot 1 and the wall. For example, based on the second patterned light P12 including the horizontal line Ph, the obstacle OB1 may be detected over a wider region in a horizontal direction, thereby enabling detection of the obstacle OB1 positioned in a region which is not within reach of the vertical line Pv of the 11th patterned light P11.

Figure 14:
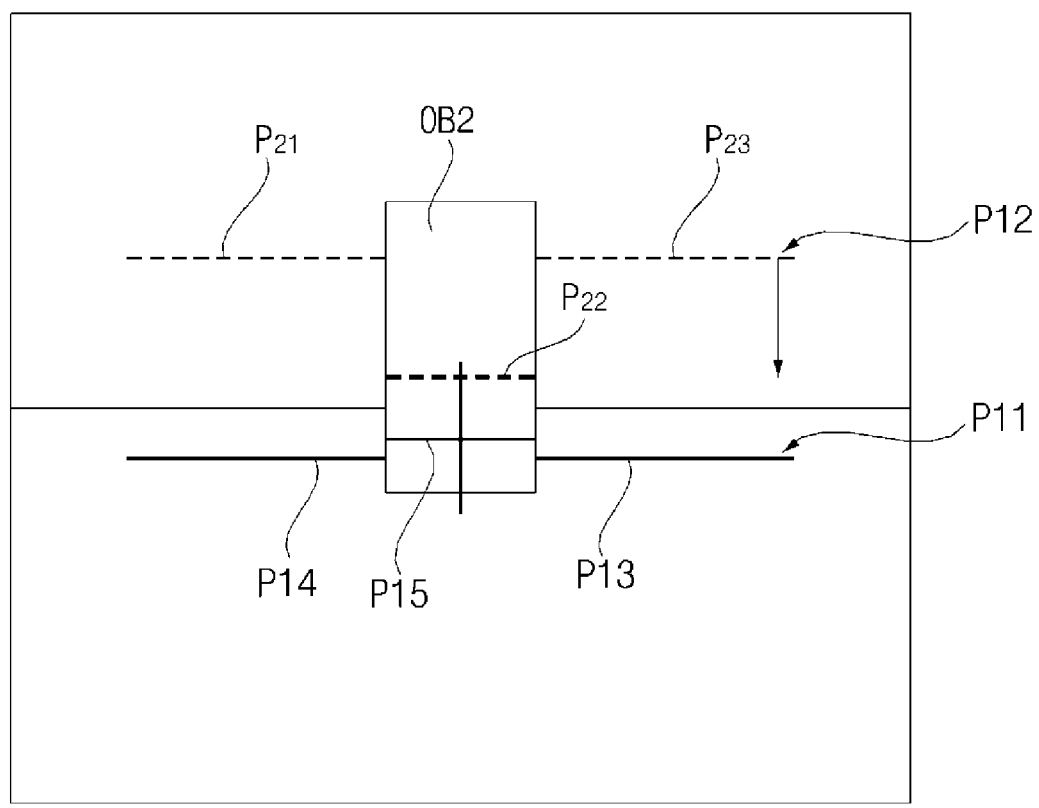
FIG. 14 is a diagram illustrating an acquired image of patterned light emitted onto an obstacle of the mobile robot illustrated in FIG. 1B.

FIG. 14 is a diagram illustrating an acquired image of patterned light emitted onto an obstacle of the mobile robot illustrated in FIG. 1B. Referring to FIG. 14, the mobile robot 1 according to an exemplary embodiment may specifically identify a stereoscopic shape of an obstacle based on the second patterned light P12, in addition to the obstacle information identified based on the first patterned light P11. For example, an actual height of an obstacle OB2 may be too high for the mobile robot 1 to pass over while traveling, but at the current position of the mobile robot 1, the first optical pattern P11 is incident on a lower portion of the obstacle. If there is no second pattern emission unit 130 or the second pattern emission unit 130 is inactive, the travel control unit 230 may erroneously determine that the main body 10 may pass over the obstacle OB2, and first control the main body 10 to travel toward the obstacle OB2. As the main body 10 moves closer to the obstacle OB2, the position of the second optical pattern P12 is gradually increased on the acquired image, such that upon determining that the height of the obstacle OB2 is at a higher level than a height at which the main body 10 may pass over, and the travel control unit 230 may control the travel driving unit 300 so that the main body 10 may bypass the obstacle OB2.

By contrast, providing the second pattern emission unit 130 to emit the second patterned light P12 incident on the obstacle OB2 at the current position of the mobile robot 1 may enable the height of the obstacle OB2 to be identified in advance. The traveling path may be further optimized based on determining the height of the obstacle OB2.

The obstacle information obtainer 220 may recognize a cliff, positioned in front of the mobile robot 1, based on the length of the vertical line Pv displayed on the acquired image. In the case where there is a cliff (for example, stairs) in front of the mobile robot 1, a front end of the horizontal line may extend to a portion below the cliff, and a portion emitted to the portion below the cliff is not displayed on the acquired image, such that the length of the vertical line Pv, displayed on the acquired image, is decreased. Accordingly, in the case where the length of the vertical line Pv is decreased, the obstacle information obtainer 220 may determine that the there is a cliff in front of the mobile robot 1, and based on the determination, the travel control unit 230 may control the travel driving unit 300 so that the mobile robot 1 may travel along a path that does not lead to the cliff. Further, in the case where a portion of the horizontal line Ph (P13 to P15) is not displayed on the acquired image, the obstacle information obtainer 220 may determine that there is a cliff on the left side or the right side of the main body.

Figure 15:
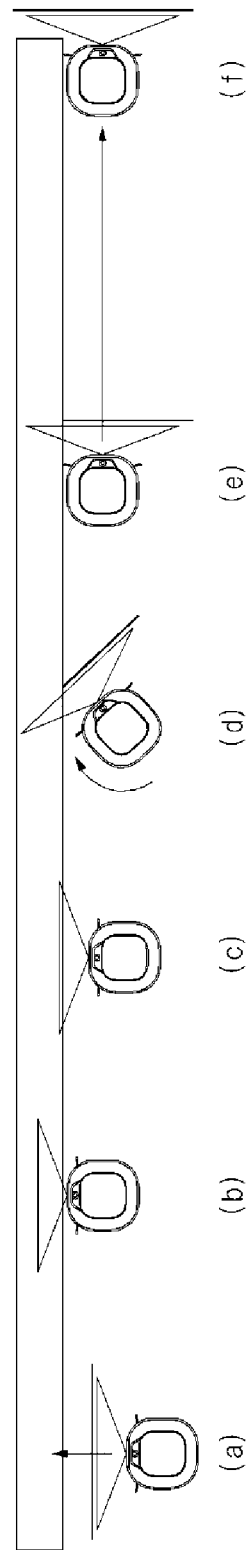
FIG. 15 is a diagram referred to in the description of a method of bypassing a cliff by a mobile robot according to an exemplary embodiment of the present disclosure.
Figure 16:
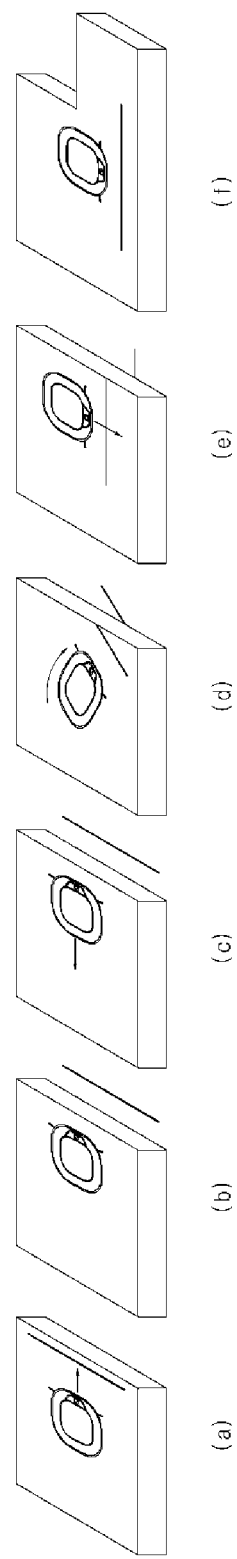
FIG. 16 is a lateral perspective view of the operation of the mobile robot illustrated in FIG. 15.
Figure 17:
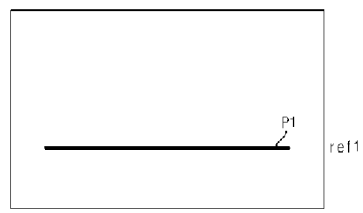
FIG. 17 is a diagram illustrating an example of a pattern emitted by the mobile robot when bypassing the cliff illustrated in FIG. 15.
Figure 17:
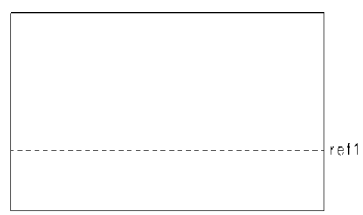
Figure 17:
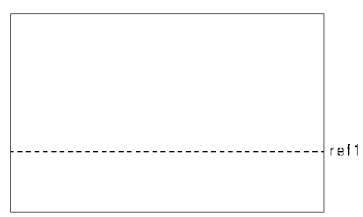
Figure 17:
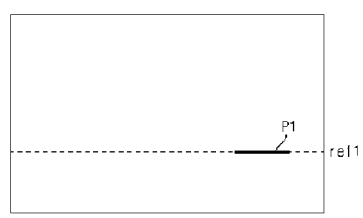
Figure 17:
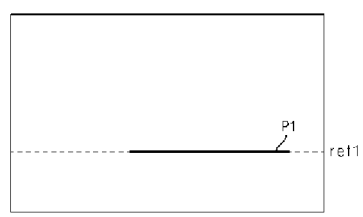
Figure 17:
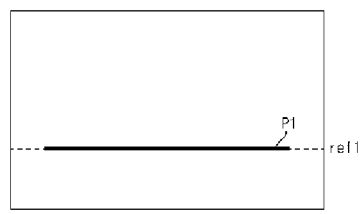

As illustrated in FIGS. 15 to 17, the mobile robot 1 detects a cliff, which is positioned in front thereof, so as not to fall off the cliff while traveling. As illustrated in FIG. 15(a), while the mobile robot 1 travels, the first patterned light P1, emitted by the first pattern emission unit 120 is included in an image captured by the image acquisition unit 140, the mobile robot 1 determines a cliff based on the first optical pattern displayed on the acquired image. Before reaching the cliff as illustrated in FIG. 16(a), the first patterned light is emitted to the floor forward of the mobile robot 1, such that the first patterned light is displayed normally as illustrated in FIG. 17(a). In the case where the mobile robot 1 moves forward to be on the edge of a cliff as illustrated in FIG. 15(b), the mobile robot 1 emits the first patterned light below the cliff as illustrated in FIG. 16(b), such that the cliff is not displayed on the acquired image as illustrated in FIG. 17(b).

Accordingly, upon determining that there is a cliff in front of the mobile robot 1, the obstacle information obtainer 220 transmits information on the cliff to the travel control unit 230. The travel control unit 230 may identify again the presence of the cliff by using a cliff sensor. The travel control unit 230 sets a cliff mode, and may control the travel driving unit 300 so that the mobile robot 1 may move backward as illustrated in FIG. 15(c). In order to secure a space to allow the mobile robot 1 to rotate in a safe manner, the travel control unit 230 controls the mobile robot 1 to move backward a predetermined distance. In the case where the mobile robot 1 moves backward as illustrated in FIG. 16(c), the travel control unit 230 controls the travel driving unit 300 so that the mobile robot 1 may rotate. When the mobile robot 1 moves backward as illustrated in FIG. 17(c), the first patterned light is not displayed. However, in the case where the backward distance is greater than D2, the first patterned light may be displayed on the acquired image during the backward movement.

As illustrated in FIG. 15(d), the mobile robot 1 rotates in either the left or the right direction. A portion of the first patterned light is emitted to the floor during the rotation as illustrated in FIG. 16(d), and accordingly, a portion of the first optical pattern is displayed on the acquired image as illustrated in FIG. 17(d).

In the case where a portion of the first optical pattern is displayed, the obstacle information obtainer 220 calculates the length of the first optical pattern, and the travel control unit 230 determines whether the calculated length of the first optical pattern is greater than a preset value. In response to the length of the first optical pattern being less than the preset value, the travel control unit 230 controls the mobile robot 1 to further rotate. When the mobile robot 1 rotates about 90 degrees, as illustrated in of FIG. 15(e) and FIG. 16(e), and when the length of the first optical pattern is greater than a preset value as illustrated in FIG. 17 (e), the travel control unit 230 controls the mobile robot 1 to move forward.

That is, as described above, when the cliff mode is set, the mobile robot 1 travels without falling off a cliff when the cliff is present on the left side or the right side of the mobile robot 1. In this case, a portion of the first optical pattern is not displayed due to the cliff. While a portion of the first optical pattern is displayed, the travel control unit 230 controls traveling in a manner that maintains the length of the first optical pattern, such that the mobile robot 1 may travel along the cliff without falling off the cliff.

In this case, without need to continuously check the cliff, the mobile robot 1 may move forward and bypass the cliff. As illustrated in FIG. 15 (f) and FIG. 16(f), in the case where the mobile robot 1 moves away from the cliff, the first optical pattern P1 is displayed normally as illustrated in FIG. 17(f). Then, the obstacle information obtainer 220 cancels the cliff mode, and the travel control unit 230 travels normally.

Figure 18:
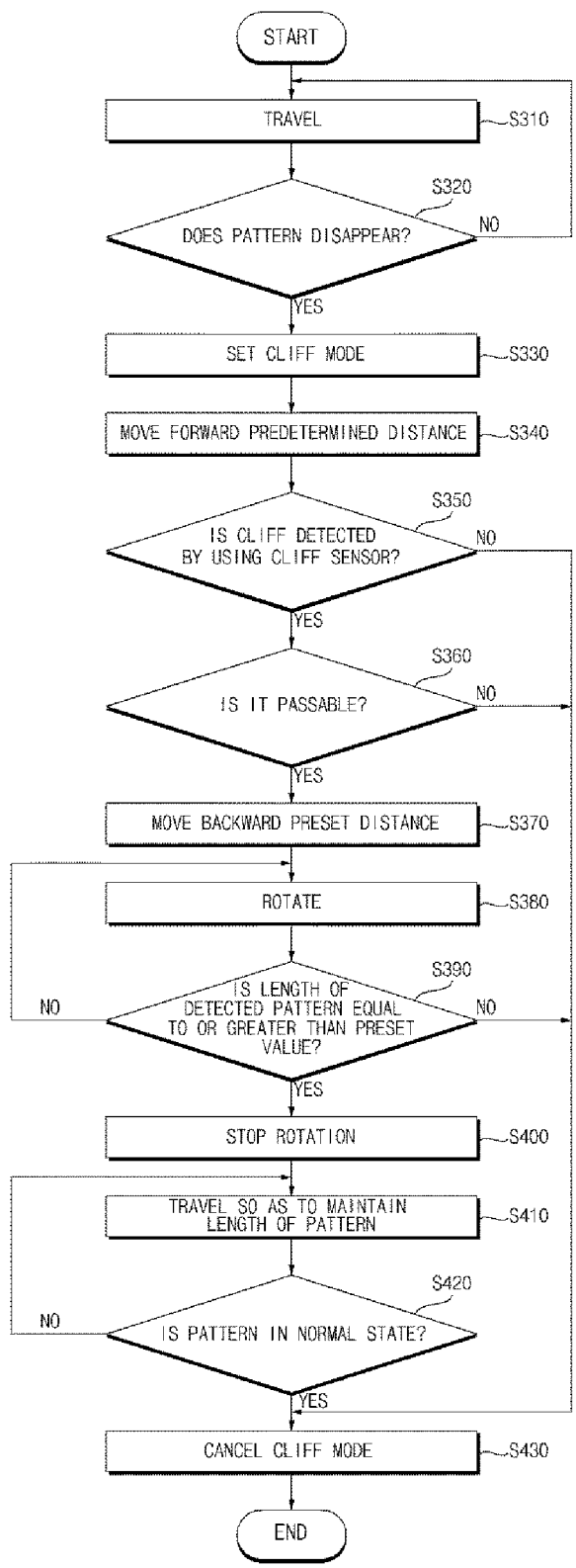
FIG. 18 is a flowchart illustrating a method of bypassing a cliff by a mobile robot according to an exemplary embodiment of the present disclosure.

FIG. 18 is a flowchart illustrating a method of bypassing a cliff by a mobile robot according to an embodiment of the present disclosure. As illustrated in FIG. 18, the mobile robot 1 detects and bypasses an obstacle while traveling in S310 based on the first optical pattern P1 and the second optical pattern P2. In this case, the first pattern emission unit and the second pattern emission unit emit the respective optical patterns, and the image acquisition unit captures and acquires the emitted optical patterns, and inputs the acquired image. The pattern detection unit detects an optical pattern from the acquired image. The obstacle information obtainer 220 analyzes the detected optical pattern and determines the position, shape, and size of the obstacle. Based on the determination, the travel control unit 230 determines whether to continue traveling, and controls the travel driving unit 300 to bypass the obstacle while traveling.

Further, in the case where the first optical pattern is not displayed normally on the acquired image while traveling, the obstacle information obtainer 220 determines that there is an obstacle in front of the mobile robot 1, and sets a cliff mode in S330. As the cliff mode is set, the travel control unit 230 controls the travel driving unit so that the mobile robot 1 may bypass the obstacle while traveling. In the case where a cliff sensor is provided for the travel control unit 230, the travel control unit 230 moves forward a predetermined distance, and determines again the presence of the cliff by using the cliff sensor in S350. The cliff sensor measures the distance to the floor, and in the case where a signal is not received, or the distance to the floor is equal to or greater than a predetermined distance, the cliff sensor inputs a cliff signal. By contrast, in the case where the cliff sensor is not provided, when the first patterned light is not displayed on the acquired image, and the cliff mode is set, the travel control unit controls the mobile robot to immediately bypass the cliff while traveling.

In response to the signal from the cliff sensor, the travel control unit determines whether it is passable in S360, and upon determining that it is not passable, the travel control unit 230 controls the mobile robot to bypass the cliff while traveling, so that the mobile robot may not fall off the cliff. In the case of a slope with a distance from the cliff sensor to the floor being equal to or less than a predetermined distance, the travel control unit 230 determines that it is passable, and based on the determination, cancels the cliff mode and controls the mobile robot to continue traveling.

In order to bypass the cliff, the travel control unit 230 may control the travel driving unit 300 so that the mobile robot 1 moves backward a predetermined distance, and then rotates in one direction in S380. In this case, the mobile robot 1 rotates in either the left or the right direction, and the rotation direction may be determined based on information on the detected obstacle while traveling. During the rotation, in the case where a portion of the first optical pattern is displayed on the acquired image, the obstacle information obtainer 220 determines whether the length of the first optical pattern is equal to or greater than a preset value in S390. In response to the length of the first optical pattern being less than the preset value, the mobile robot 1 continues rotating in S380 and S390.

In response to the length of the first optical pattern being equal to or greater than the preset value, the travel control unit 230 stops the rotation in S400. In some cases, once the main body 10 rotates at a designated angle regardless of the length of the first optical pattern, the travel control unit 230 may control the main body 10 to move forward and travel. However, in the case where the first optical pattern is partially displayed on the acquired image after the rotation, the travel control unit 230 controls the main body 10 to continue traveling, and in the case where the first optical pattern is not displayed on the acquired image, the travel control unit 230 determines that there is a possibility that the mobile robot may fall off a cliff, and controls the mobile robot to further move or rotate.

The travel control unit 230 controls traveling in S410, so that the length of the first optical pattern is maintained. The obstacle information obtainer 220 calculates the length of the first optical pattern; and in the case where the length of the first optical pattern is decreased, the travel control unit 230 determines that the mobile robot approaches the cliff, and controls the mobile robot to further rotate while traveling. The obstacle information obtainer 220 determines whether the length of the first optical pattern, displayed on the acquired image, is normal. In response to the length of the first optical pattern being normal, the obstacle information obtainer 220 determines that the mobile robot has bypassed the cliff, and cancels the cliff mode in S430. In the case where the length of the first optical pattern is normal, and is located at a reference position, the obstacle information obtainer 220 determines that the mobile robot is in a normal state.

Then, as the mobile robot has bypassed the cliff, the travel control unit 230 controls the travel driving unit 300 so that the mobile robot may proceed to perform a designated operation, e.g., cleaning or moving to a specific position, and accordingly, the cleaning unit 310 also performs a cleaning operation by sucking foreign materials while traveling. As described above, the mobile robot 1 may determine a cliff by using optical patterns, and may immediately bypass the cliff without need to repeatedly approach the cliff while traveling along a path that does not lead to the cliff. The present disclosure provides the mobile robot to bypass the cliff immediately without need to approach the cliff, thereby preventing the mobile robot from falling off the cliff, and thus improving traveling safety.

The present disclosure may provide a mobile robot and a method of controlling the same, in which when the mobile robot, while travelling, encounters a cliff such as stairs, the mobile robot may determine the presence of a cliff by using emitted patterns and may bypass the cliff immediately.

In accordance with one aspect, there is provided a mobile robot, including: a main body configured to travel in an area to be cleaned and suck foreign materials on a floor of the area to be cleaned; a first pattern emission unit provided on a front surface of the main body and configured to emit a first patterned light downward and forward from the main body; a second pattern emission unit provided on the surface of the main body and below the first pattern emission unit, and configured to emit a second patterned light upward and forward from the main body; an image acquisition unit provided on the front surface of the main body and configured to acquire a forward image of the main body; and a controller configured to determine an obstacle by detecting a first optical pattern, corresponding to the first patterned light, and a second optical pattern, corresponding to the second patterned light, from the image acquired from the image acquisition unit, and control the main body to pass through or bypass the obstacle, wherein the controller determines a cliff based on a shape of the first optical pattern displayed on the acquired image, and controls the main body to travel along a path that does not lead to the cliff.

In accordance with another aspect, there is provided a method of controlling a mobile robot, the method including: traveling while emitting a first patterned light and a second patterned light and acquiring a forward image of the mobile robot; detecting a first optical pattern, corresponding to the first patterned light, and a second optical pattern, corresponding to the second patterned light, from the acquired image; detecting an obstacle based on the first optical pattern and the second optical pattern; detecting a cliff among a plurality of obstacles based on a shape of the first optical pattern displayed on the acquired image; and bypassing the cliff by traveling along a path that does not lead to the cliff to bypass the cliff.

The present disclosure provides the mobile robot and the method of controlling the same, in which by using patterns which are vertically provided and emitted, more specific information on obstacles may be obtained; particularly before approaching a cliff such as stairs, the presence of a cliff may be determined immediately, and the height of the cliff may be identified to determine whether it is passable; and a cliff such as stairs may be differentiated from a threshold to determine whether to pass through or bypass the cliff, thereby enabling fast determination and operation for more effective traveling, and preventing in advance the mobile robot from falling off the cliff such as stairs and the like.

While the present disclosure has been described herein with reference to the accompanying drawings, this disclosure is only illustrative of preferred embodiments of the present disclosure and is not intended to limit the present disclosure. Further, it will be apparent to those skilled in the art that various modifications and variations may be made without departing from the spirit and scope of the disclosure.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile robot, comprising:
    a main body configured to travel in an area to be cleaned and to suck foreign materials on a floor of the area to be cleaned;
    a camera provided on a front portion of the main body and configured to capture an image of a prescribed area;
    a first light source provided on the front portion of the main body and configured to emit a first patterned light at a downward angle toward a first sub-region of the prescribed area; and
    a controller configured to:
        detect whether the image captured by camera includes a first optical pattern corresponding to the first patterned light,
        identify an obstacle in the prescribed area based on the first optical pattern, and
        control a movement of the main body relative to the obstacle,
    wherein the controller, when identifying the obstacle, is further configured to determine that the obstacle includes a cliff based on at least one of a shape or location of the first optical pattern in the image,
    wherein the controller, when controlling the movement of the main body, is further configured to cause the mobile robot to move in a first direction to another location after detecting the cliff,
    wherein the camera is further configured to capture another image at the other location, and
    wherein the controller is further configured to:
        identify, in the other image, another first optical pattern corresponding to at least a portion of the first patterned light emitted by the first light source at the other location,
        compare one or more dimensions of the other first optical pattern to one or more dimensions of the first optical pattern, and
        control the movement of the main body based on comparing the one or more dimensions of the other first optical pattern to the one or more dimensions of the first optical pattern.

2. The mobile robot of claim 1, further comprising:
    a second light source provided below the first light source on the front portion of the main body and configured to emit a second patterned light toward a second sub-region of the prescribed area that is positioned above the first sub-region, and
    wherein the controller is further configured to:
        detect, in the image captured by camera, a second optical pattern corresponding to a portion of the second patterned light, and
        identify the obstacle in the prescribed area further based on the second optical pattern.

3. The mobile robot of claim 2, wherein the controller is further configured to determine that the obstacle extends above a top portion of the main body when the image includes the second optical pattern.

4. The mobile robot of claim 2, wherein the first light source, the second light source, and the camera are vertically aligned on the front portion of the main body.

5. The mobile robot of claim 2, wherein the camera is provided between the first light source and the second light source.

6. The mobile robot of claim 4, wherein the first light source and the second light source are to be vertically symmetric to each other such that the first light source emits at an angle below horizontal and the second light source emits at a corresponding angle above horizontal.

7. The mobile robot of claim 2, wherein:
the first patterned light includes a first horizontal line segment; and
the second patterned light includes a second horizontal line segment.

8. The mobile robot of claim 1, wherein the first patterned light includes a first horizontal line segment and a vertical line segment that intersects the first horizontal line segment.

9. The mobile robot of claim 1, wherein the controller is further configured to determine that the cliff located to a side of a travelling direction of the mobile robot when first optical pattern includes the portion of first patterned light and excludes another portion of the first patterned light.

10. The mobile robot of claim 9, wherein the controller, when controlling the movement of the main body, is further configured to cause the mobile robot to change the travel direction away the side associated with the cliff.

11. The mobile robot of claim 1, wherein the controller is further configured to determine that the cliff is located in a travelling direction of the mobile robot when controller determines that the image excludes the first optical pattern.

12. The mobile robot of claim 11, further comprising:
a cliff sensor positioned on a bottom portion of the main body and facing a floor being cleaned by the mobile robot,
wherein, when determining that the image excludes the first optical pattern, the controller further configured to:
control the main body to move forward a prescribed distance, and
verify, using the cliff sensor, a presence of the cliff.

13. The mobile robot of claim 12, wherein the cliff sensor is configured to determine a distance between the cliff sensor and a surface under the cliff sensor, and
wherein the controller, when controlling the movement of the main body relative to the obstacle, is further configured to:
cause the mobile robot to move away from the obstacle when the distance between the cliff sensor and the surface under the cliff sensor is greater than or equal to a threshold distance, and
cause the mobile robot to move toward the obstacle when the distance between the cliff sensor and the surface under the cliff sensor is less than the threshold distance.

14. The mobile robot of claim 1, wherein the controller, based on determining that the cliff is located in the travelling direction of the mobile robot, is further configured to control the main body to move backward a prescribed distance after detecting the cliff, and rotate by a prescribed angle of rotation after moving backwards the prescribed distance.

15. The mobile robot of claim 1, wherein the controller is further configured to:
cause the mobile robot to continue in the first direction when the one or more dimensions of the other first optical pattern correspond to or are larger than the one or more dimensions of the first optical pattern, and
cause the robot to rotate and move in a second direction that is different from the first direction when the one or more dimensions of the other first optical pattern are smaller than the one or more dimensions of the first optical pattern.

16. The mobile robot of claim 1,
wherein the controller is further configured to determine that an obstacle is not present in the other prescribed area when the other first optical pattern is located at a reference position within the other image, the reference position corresponding to a portion of the other image where the other first optical pattern would be positioned when the first patterned light does not intersect an obstacle in the other prescribed area.

17. The mobile robot of claim 2, wherein the controller is further configured to identify an edge of the obstacle based on a difference between a shape of the first optical pattern and a shape of the first patterned light.

18. The mobile robot of claim 1, wherein the first light source includes a laser diode (LD) or a light-emitting diode (LED) to generate light and an optical pattern projection element (OPPE) to convert the light into the first patterned light.

19. The mobile robot of claim 1, wherein the camera is positioned below the first light source.

20. A mobile robot, comprising:
a main body configured to travel in an area to be cleaned and to suck foreign materials on a floor of the area to be cleaned;
a camera provided on a front portion of the main body and configured to capture an image of a prescribed area;
a first light source provided on the front portion of the main body and configured to emit a first patterned light at a downward angle toward a first sub-region of the prescribed area; and
a controller configured to:
detect whether the image captured by camera includes a first optical pattern corresponding to the first patterned light,
identify an obstacle in the prescribed area based on the first optical pattern, and
control a movement of the main body relative to the obstacle,
wherein the controller, when identifying the obstacle, is further configured to determine that the obstacle includes a cliff based on at least one of a shape or location of the first optical pattern in the image, and
wherein the controller is further configured to determine that the cliff is located in a travelling direction of the mobile robot when controller determines that the image excludes the first optical pattern.

* * * * *